United States Patent
Park et al.

(10) Patent No.: US 11,432,310 B2
(45) Date of Patent: Aug. 30, 2022

(54) METHOD FOR TRANSMITTING AND RECEIVING UPLINK DEMODULATION REFERENCE SIGNAL IN WIRELESS COMMUNICATION SYSTEM, AND APPARATUS THEREFOR

(71) Applicant: LG ELECTRONICS INC., Seoul (KR)

(72) Inventors: Jonghyun Park, Seoul (KR); Kijun Kim, Seoul (KR); Byounghoon Kim, Seoul (KR); Haewook Park, Seoul (KR); Hanbyul Seo, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 558 days.

(21) Appl. No.: 16/088,793

(22) PCT Filed: Mar. 24, 2017

(86) PCT No.: PCT/KR2017/003189
§ 371 (c)(1),
(2) Date: Aug. 19, 2020

(87) PCT Pub. No.: WO2017/171314
PCT Pub. Date: Oct. 5, 2017

(65) Prior Publication Data
US 2021/0185706 A1    Jun. 17, 2021

Related U.S. Application Data

(60) Provisional application No. 62/384,692, filed on Sep. 7, 2016, provisional application No. 62/313,804, filed on Mar. 27, 2016.

(51) Int. Cl.
H04W 72/12    (2009.01)
H04L 5/00    (2006.01)
(Continued)

(52) U.S. Cl.
CPC ..... H04W 72/1268 (2013.01); H04J 13/0003 (2013.01); H04J 13/004 (2013.01);
(Continued)

(58) Field of Classification Search
CPC ......... H04W 72/1268; H04W 72/1257; H04W 72/1289; H04W 72/04; H04L 27/26136;
(Continued)

(56) References Cited

U.S. PATENT DOCUMENTS

2012/0170479 A1*    7/2012    Ren .................. H04L 5/0055
                                                      370/252
2013/0114547 A1    5/2013    Li et al.
(Continued)

FOREIGN PATENT DOCUMENTS

CN    102598530    7/2012
CN    104704786    6/2015
(Continued)

OTHER PUBLICATIONS

European Patent Office Application Serial No. 17775739.0, Search Report dated Oct. 11, 2019, 8 pages.
(Continued)

*Primary Examiner* — Candal Elpenord
(74) *Attorney, Agent, or Firm* — Lee, Hong, Degerman, Kang & Waimey PC

(57) ABSTRACT

Disclosed are a method for transmitting and receiving an uplink demodulation reference signal (DMRS) in a wireless communication system, and an apparatus therefore. Particularly, a method by which a terminal transmits a DMRS in a wireless communication system comprises the steps of: receiving, from a base station, downlink control information (DCI) for physical uplink shared channel (PUSCH) scheduling; generating a DMRS sequence for the PUSCH; and mapping the DMRS sequence to a physical resource,
(Continued)

wherein the DMRS sequence can be mapped with the spacing of a predetermined resource element (RE) within the symbol to which the DMRS sequence is mapped.

20 Claims, 15 Drawing Sheets

(51) Int. Cl.
*H04J 13/00* (2011.01)
*H04L 27/26* (2006.01)

(52) U.S. Cl.
CPC ........ *H04L 5/0051* (2013.01); *H04L 27/2607* (2013.01); *H04L 27/26136* (2021.01); *H04W 72/1257* (2013.01); *H04W 72/1289* (2013.01)

(58) Field of Classification Search
CPC ................ H04L 27/2607; H04L 5/0051; H04J 13/0003; H04J 13/004
USPC .................................................. 370/329–330
See application file for complete search history.

(56) References Cited

U.S. PATENT DOCUMENTS

| | | | | |
|---|---|---|---|---|
| 2013/0121280 | A1* | 5/2013 | Ouchi | ................... H04L 5/0048 370/329 |
| 2014/0286255 | A1 | 9/2014 | Nam et al. | |
| 2014/0293881 | A1 | 10/2014 | Khoshnevis et al. | |
| 2015/0023270 | A1 | 1/2015 | Park et al. | |
| 2015/0036607 | A1* | 2/2015 | Park | ...................... H04L 5/0048 370/329 |
| 2015/0043513 | A1* | 2/2015 | Noh | ..................... H04W 72/042 370/329 |
| 2016/0006548 | A1 | 1/2016 | Yang et al. | |

FOREIGN PATENT DOCUMENTS

| | | |
|---|---|---|
| CN | 105191175 | 12/2015 |
| EP | 2975783 | 1/2016 |

OTHER PUBLICATIONS

Samsung, "Performance Evaluation of FD-MIMO with DMRS Enhancement", 3GPP TSG RAN WG1 Meeting #80bis, R1-151648, XP050950376, Apr. 2015, 4 pages.
Korean Intellectual Property Office Application No. 10-2018-7027258, Office Action dated Feb. 25, 2020, 6 pages.
3rd Generation Partnership Project (3GPP), "Technical Specification Group Radio Access Network; Evolved Universal Terrestrial Radio Access (E-UTRA); Physical channels and modulation (Release 13)," 3GPP TS 36.211 V13.0.0, Dec. 2015, 142 pages.
State Intellectual Property Office of the People's Republic of China Application Serial No. 201780020099 3, Office Action dated Aug. 31, 2020, 21 pages.
PCT International Application No. PCT/KR2017/003189, International Search Report dated Jul. 20, 2017, 3 pages.
ZTE, "Link level performance of DMRS for V2V," 3GPP TSG-RAN WG1 #84, R1-160692, Feb. 2016, 9 pages.

* cited by examiner (a)

(b)

METHOD FOR TRANSMITTING AND RECEIVING UPLINK DEMODULATION REFERENCE SIGNAL IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2017/003189, filed on Mar. 24, 2017, which claims the benefit of U.S. Provisional Application No. 62/313,804, filed on Mar. 27, 2016, and 62/384,692, filed on Sep. 7, 2016, the contents of which are all hereby incorporated by reference herein in their entireties.

TECHNICAL FIELD

The present invention relates to a wireless communication system and, more particularly, to a method for generating/mapping an uplink Demodulation Reference Signal (DMRS) sequence, a method for transmitting and receiving a DMRS by using the sequence generating/mapping method and an apparatus supporting the methods.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present invention is to provide a method for generating/mapping an uplink DMRS sequence and a method for transmitting and receiving a DMRS by using the method.

Also, an object of the present invention is to provide a method for allocating an orthogonal uplink DMRS.

Technical objects to be achieved by the present invention are not limited to the aforementioned technical objects, and other technical objects not described above may be evidently understood by a person having ordinary skill in the art to which the present invention pertains from the following description.

Technical Solution

According to one aspect of the present invention, a method for transmitting an uplink Demodulation Reference Signal (DMRS) by a user equipment (UE) in a wireless communication system comprises receiving Downlink Control Information (DCI) for Physical Uplink Shared Channel (PUSCH) scheduling from a base station; generating a DMRS sequence for the PUSCH; and mapping the DMRS sequence to a physical resource, wherein the DMRS sequence is mapped with spacing of a predetermined Resource Element (RE) within a symbol to which the DMRS sequence is mapped.

According to another aspect of the present invention, a UE transmitting an uplink DMRS in a wireless communication system comprises a Radio Frequency (RF) unit for transmitting and receiving a radio signal and a processor for controlling the RF unit, wherein the processor is configured to receive Downlink Control Information (DCI) for Physical Uplink Shared Chanel (PUSCH) scheduling from a base station, to generate a DMRS sequence for the PUSCH; and to map the DMRS sequence to a physical resource, wherein the DMRS sequence is mapped to a predetermined Resource Element (RE) within a symbol to which the DMRS sequence is mapped.

Preferably, the spacing of the predetermined RE may be 2.

Preferably, the DMRS sequence may be mapped only to an RE having an even-numbered frequency domain index or only to an RE having an odd-numbered frequency domain index.

Preferably, a factor for determining a cyclic shift value applied to the DMRS sequence, an Orthogonal Cover Code (OCC) applied to the DMRS sequence, and an indicator for determining a mapping resource of the DMRS sequence may be transmitted after being jointly encoded.

Preferably, an RE to which the DMRS sequence is mapped may be determined according to the value of an indicator for determining a mapping resource of the DMRS resource.

Preferably, the DCI may include a cyclic shift field; a first mapping table among a factor for determining a cyclic shift value applied to the DMRS sequence, an OCC applied to the DMRS sequence, an indicator for determining a mapping resource of the DMRS sequence, and the cyclic shift field is predefined; and the value of the factor, the codeword of the OCC, and the value of the indicator may be determined, by the first mapping table, using the value of the cyclic shift field.

Preferably, values which may ensure a maximum cyclic shift distance among values that may be indicated by the cyclic shift field indicate a first value of an indicator for determining a mapping resource of the DMRS sequence, and the remaining values may indicate a second value of the indicator for determining a mapping resource of the DMRS sequence.

Preferably, the cyclic shift field is configured with (or composed of) 3 bits, and if the value of the cyclic shift field is '000', '001', '010', or '111', it may indicate a first value of the indicator for determining a mapping resource of the DMRS sequence, and if the value of the cyclic shift field is '011', '100', '101', or '110', it may indicate a second value of the indicator for determining a mapping resource of the DMRS sequence.

Preferably, the value of an indicator for determining a mapping resource of the DMRS sequence may be applied commonly to all of the layers used for transmission of the PUSCH.

Preferably, a second mapping table among a factor for determining a cyclic shift value applied to the DMRS sequence, an OCC applied to the DMRS sequence, and the cyclic shift field is predefined, and whether to use the first mapping table or the second mapping table is indicated by the indicator for indicating a mapping table within DCI.

Preferably, at the time of retransmission of the PUSCH, the same value as that of an indicator for determining a mapping resource of the DMRS sequence used for transmission of the PUSCH may be used.

Preferably, when a Radio Resource Control (RRC) layer parameter related to whether to use the first mapping table is configured for the UE, the value of the factor, codeword of the OCC, and value of the indicator may be determined, by the first mapping table, using the value of the cyclic shift field.

Preferably, the DMRS sequence may be frequency-multiplexed by being interlaced-mapped with a DMRS sequence of another UE in units of resource elements within the predetermined symbol.

Preferably, the time domain index of the symbol to which the DMRS sequence is mapped is 3 in the case of normal Cyclic Prefix (CP) and 2 in the case of extended CP.

Advantageous Effects

According to an embodiment of the present invention, partially overlapping frequency bandwidth (BW) may be allocated, and a larger number of orthogonal uplink DMRSs may be allocated to enable two or more Uplink Multi-User Multi-Input Multi-Output (UL MU-MIMO) scheduling.

Also, according to an embodiment of the present invention, orthogonality is ensured for a larger number of uplink DMRSs compared with the prior art, and thereby flexibility may be ensured for UL MU-MIMO scheduling.

Effects which may be obtained by the present invention are not limited to the aforementioned effects, and other technical effects not described above may be evidently understood by a person having ordinary skill in the art to which the present invention pertains from the following description.

DESCRIPTION OF DRAWINGS

The accompanying drawings, which are included herein as a part of the description for help understanding the present invention, provide embodiments of the present invention, and describe the technical features of the present invention with the description below.

MODE FOR INVENTION

Figure 1:
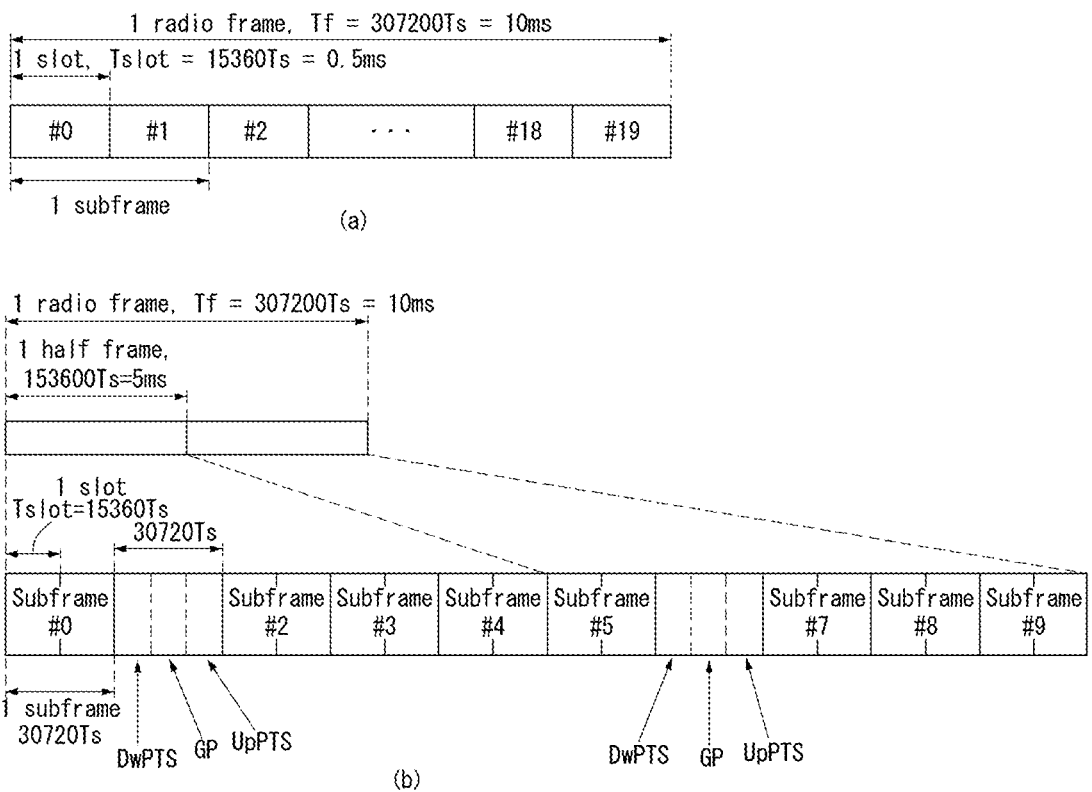
FIG. 1 illustrates the structure of a radio frame in a wireless communication system to which the present invention may be applied.

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP).

Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which the Present Invention May be Applied

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$. A UL and DL transmission includes the radio frame having a duration of $T\_f=307200*T\_s=10$ ms.

FIG. 1(*a*) exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot 2i and slot 2i+1. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(*b*) shows frame structure type 2.

A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and an Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of $T\_slot=15360*T\_s=0.5$ ms.

The UL-DL configuration may be classified into 7 types, and the position and/or the number of a DL subframe, a special subframe and a UL subframe are different for each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 represents configuration (length of DwPTS/GP/UpPTS) of a special subframe.

Figure 3:
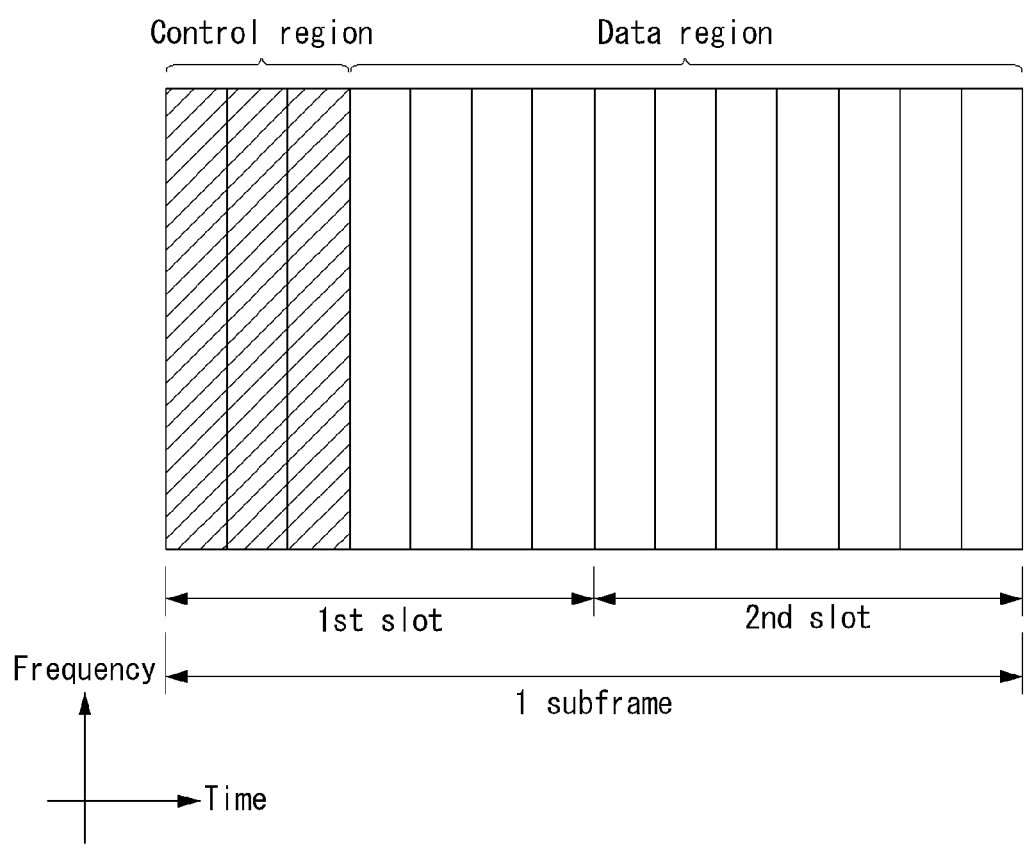
FIG. 3 illustrates a structure of downlink subframe in a wireless communication system to which the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of a radio subframe according to the example of FIG. 1 is just an example, and the number of subcarriers included in a radio frame, the number of slots included in a subframe and the number of OFDM symbols included in a slot may be changed in various manners.

Figure 2:
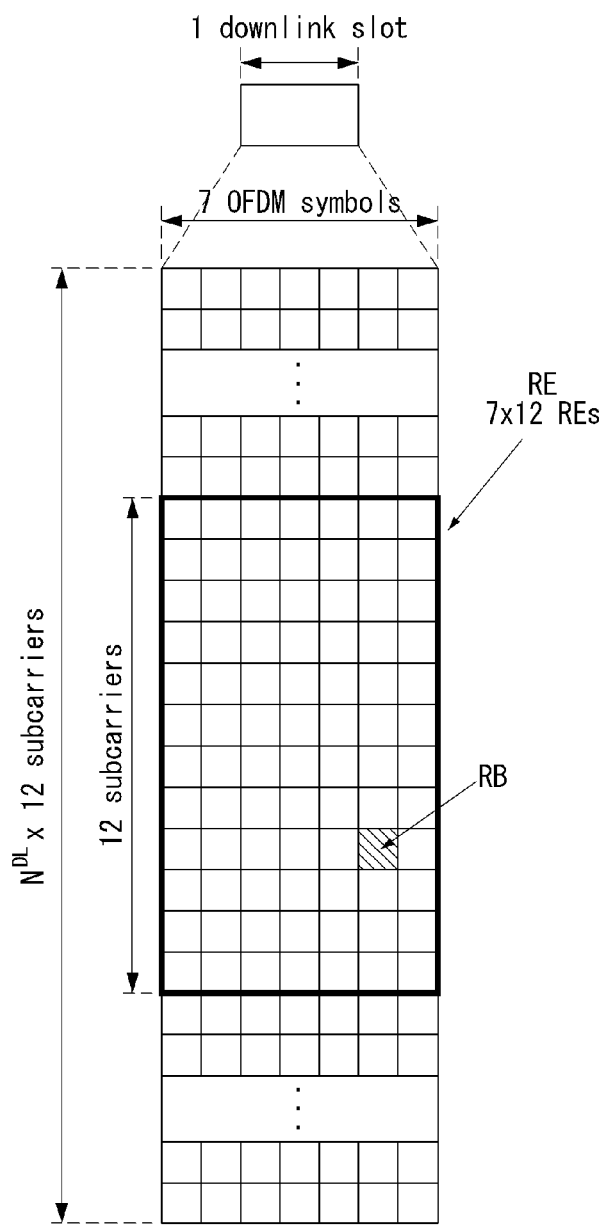
FIG. 2 is a diagram illustrating a resource grid for a downlink slot in a wireless communication system to which the present invention may be applied.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs N^DL included in a downlink slot depends on a downlink transmission bandwidth.

The structure of an uplink slot may be the same as that of a downlink slot.

FIG. 3 shows the structure of a downlink subframe in a wireless communication system to which an embodiment of the present invention may be applied.

SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

Figure 4:
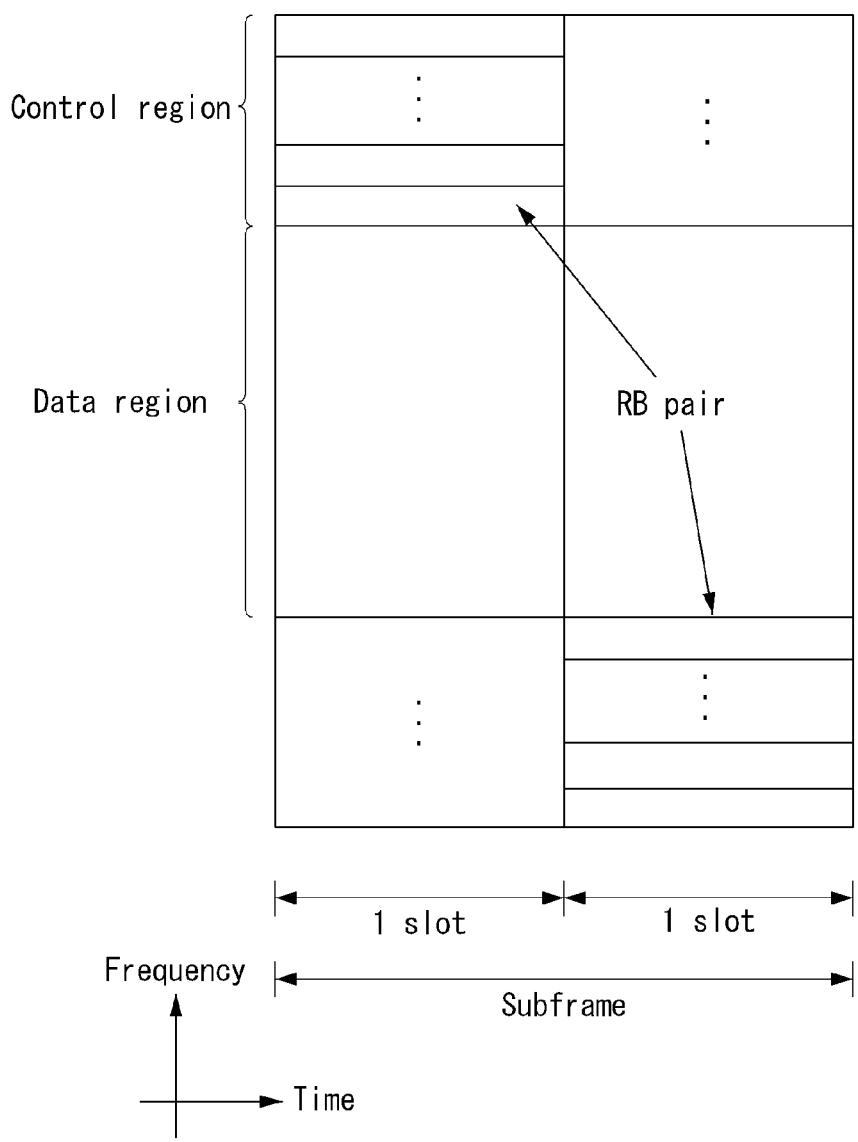
FIG. 4 illustrates a structure of uplink subframe in a wireless communication system to which the present invention may be applied.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna.".

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

Meanwhile, the multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

Figure 5:
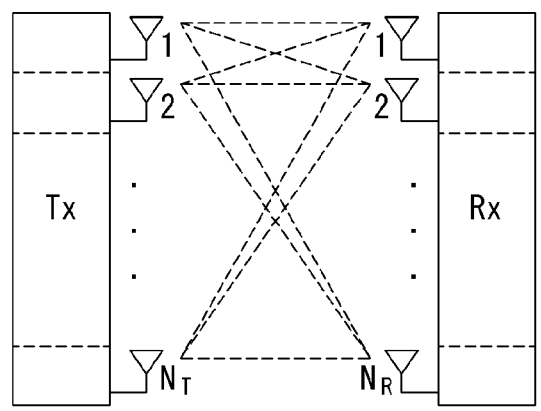
FIG. 5 shows the configuration of a known MIMO communication system.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R) \quad \text{[Equation 1]}$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case may include a Maximum Likelihood Detection (MLD) receiver, a Zero-Forcing (ZF) receiver, a Minimum Mean Square Error (MMSE) receiver, Diagonal-Bell Laboratories Layered Space-Time (D-BLAST), and Vertical-Bell Laboratories Layered Space-Time (V-BLAST). In particular, if a transmission end can be aware of channel information, a Singular Value Decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and NR reception antennas are present.

First, a transmission signal is described below. If the N_T transmission antennas are present as described above, a maximum number of pieces of information which can be transmitted are N_T, which may be represented using the following vector.

$$s=[s_1,s_2,\ldots,s_{N_T}]^T \qquad \text{[Equation 2]}$$

Meanwhile, transmission power may be different in each of pieces of transmission information s_1, s_2, ..., s_NT. In this case, if pieces of transmission power are P_1, P_2, ..., P_NT, transmission information having controlled transmission power may be represented using the following vector.

$$\hat{s}=[\hat{s}_1,\hat{s}_2,\ldots,\hat{s}_{N_T}]^T=[P_1s_1,P_2s_2,\ldots,P_{N_T}s_{N_T}]^T \qquad \text{[Equation 3]}$$

Furthermore, transmission information having controlled transmission power in the Equation 3 may be represented as follows using the diagonal matrix P of transmission power.

$$\hat{s}=\begin{bmatrix} P_1 & & & 0 \\ & P_2 & & \\ & & \ddots & \\ 0 & & & P_{N_T} \end{bmatrix}\begin{bmatrix} s_1 \\ s_2 \\ \vdots \\ s_{N_T} \end{bmatrix}=Ps \qquad \text{[Equation 4]}$$

Meanwhile, the information vector having controlled transmission power in the Equation 4 is multiplied by a weight matrix W, thus forming N_T transmission signals x_1, x_2, ..., x_NT that are actually transmitted. In this case, the weight matrix functions to properly distribute the transmission information to antennas according to a transport channel condition. The following may be represented using the transmission signals x_1, x_2, ..., x_NT.

$$x=\begin{bmatrix} x_1 \\ x_2 \\ \vdots \\ x_i \\ \vdots \\ x_{N_T} \end{bmatrix}=\begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix}\begin{bmatrix} \hat{s}_1 \\ \hat{s}_2 \\ \vdots \\ \hat{s}_j \\ \vdots \\ \hat{s}_{N_T} \end{bmatrix}=W\hat{s}=WPs$$

In this case, w_ij denotes weight between an i-th transmission antenna and a j-th transmission information, and W is an expression of a matrix of the weight. Such a matrix W is called a weight matrix or precoding matrix.

Meanwhile, the transmission signal x, such as that described above, may be considered to be used in a case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, ..., y_NR of the respective antennas are represented as follows using a vector y.

$$y=[y_1,y_2,\ldots,y_{N_R}]^T \qquad \text{[Equation 6]}$$

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

Figure 6:
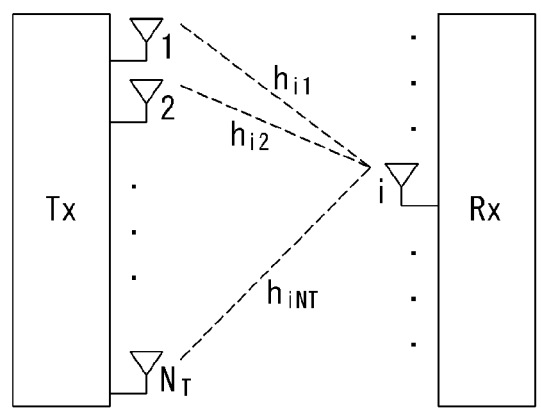
FIG. 6 is a diagram showing a channel from a plurality of transmission antennas to a single reception antenna.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T=[h_{i1},h_{i2},\ldots,h_{iN_T}] \qquad \text{[Equation 7]}$$

Furthermore, if all channels from the N_T transmission antenna to NR reception antennas are represented through a matrix expression, such as Equation 7, they may be represented as follows.

$$H=\begin{bmatrix} h_1^T \\ h_2^T \\ \vdots \\ h_i^T \\ \vdots \\ h_{N_R}^T \end{bmatrix}=\begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \qquad \text{[Equation 8]}$$

Meanwhile, Additive White Gaussian Noise (AWGN) is added to an actual channel after the actual channel experiences the channel matrix H. Accordingly, AWGN n_1, n_2, ..., n_NR added to the N_R reception antennas, respectively, are represented using a vector as follows.

$$n=[n_1,n_2,\ldots,n_{N_R}]^T \qquad \text{[Equation 9]}$$

A transmission signal, a reception signal, a channel, and AWGN in a multi-input/output antenna communication system may be represented to have the following relationship through the modeling of the transmission signal, reception signal, channel, and AWGN, such as those described above.

$$y=\begin{bmatrix} y_1 \\ y_2 \\ \vdots \\ y_i \\ \vdots \\ y_{N_R} \end{bmatrix}=\begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix}\begin{bmatrix} x_1 \\ x_2 \\ \vdots \\ x_j \\ \vdots \\ x_{N_T} \end{bmatrix}+\begin{bmatrix} n_1 \\ n_2 \\ \vdots \\ n_i \\ \vdots \\ n_{N_R} \end{bmatrix}= \qquad \text{[Equation 10]}$$

$$Hx+n$$

Meanwhile, the number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \leq \min(N_T, N_R) \quad \text{[Equation 11]}$$

Furthermore, if a matrix is subjected to Eigen value decomposition, a rank may be defined as the number of Eigen values that belong to Eigen values and that are not 0. Likewise, if a rank is subjected to Singular Value Decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Reference Signal (RS)

In a wireless communication system, a signal may be distorted during transmission because data is transmitted through a radio channel. In order for a reception end to accurately receive a distorted signal, the distortion of a received signal needs to be corrected using channel information. In order to detect channel information, a method of detecting channel information using the degree of the distortion of a signal transmission method and a signal known to both the transmission side and the reception side when they are transmitted through a channel is chiefly used. The aforementioned signal is called a pilot signal or reference signal (RS).

Furthermore recently, when most of mobile communication systems transmit a packet, they use a method capable of improving transmission/reception data efficiency by adopting multiple transmission antennas and multiple reception antennas instead of using one transmission antenna and one reception antenna used so far. When data is transmitted and received using multiple input/output antennas, a channel state between the transmission antenna and the reception antenna must be detected in order to accurately receive the signal. Accordingly, each transmission antenna must have an individual reference signal.

In a mobile communication system, an RS may be basically divided into two types depending on its object. There are an RS having an object of obtaining channel state information and an RS used for data demodulation. The former has an object of obtaining, by a UE, to obtain channel state information in the downlink. Accordingly, a corresponding RS must be transmitted in a wideband, and a UE must be capable of receiving and measuring the RS although the UE does not receive downlink data in a specific subframe. Furthermore, the former is also used for radio resources management (RRM) measurement, such as handover. The latter is an RS transmitted along with corresponding resources when an eNB transmits the downlink. A UE may perform channel estimation by receiving a corresponding RS and thus may demodulate data. The corresponding RS must be transmitted in a region in which data is transmitted.

A downlink RS includes one common RS (CRS) for the acquisition of information about a channel state shared by all of UEs within a cell and measurement, such as handover, and a dedicated RS (DRS) used for data demodulation for only a specific UE. Information for demodulation and channel measurement can be provided using such RSs. That is, the DRS is used for only data demodulation, and the CRS is used for the two objects of channel information acquisition and data demodulation.

The reception side (i.e., UE) measures a channel state based on a CRS and feeds an indicator related to channel quality, such as a channel quality indicator (CaI), a precoding matrix index (PMI) and/or a rank indicator (RI), back to the transmission side (i.e., an eNB). The CRS is also called a cell-specific RS. In contrast, a reference signal related to the feedback of channel state information (CSI) may be defined as a CSI-RS.

The DRS may be transmitted through resource elements if data on a PDSCH needs to be demodulated. A UE may receive information about whether a DRS is present through a higher layer, and the DRS is valid only if a corresponding PDSCH has been mapped. The DRS may also be called a UE-specific RS or demodulation RS (DMRS).

Figure 7:
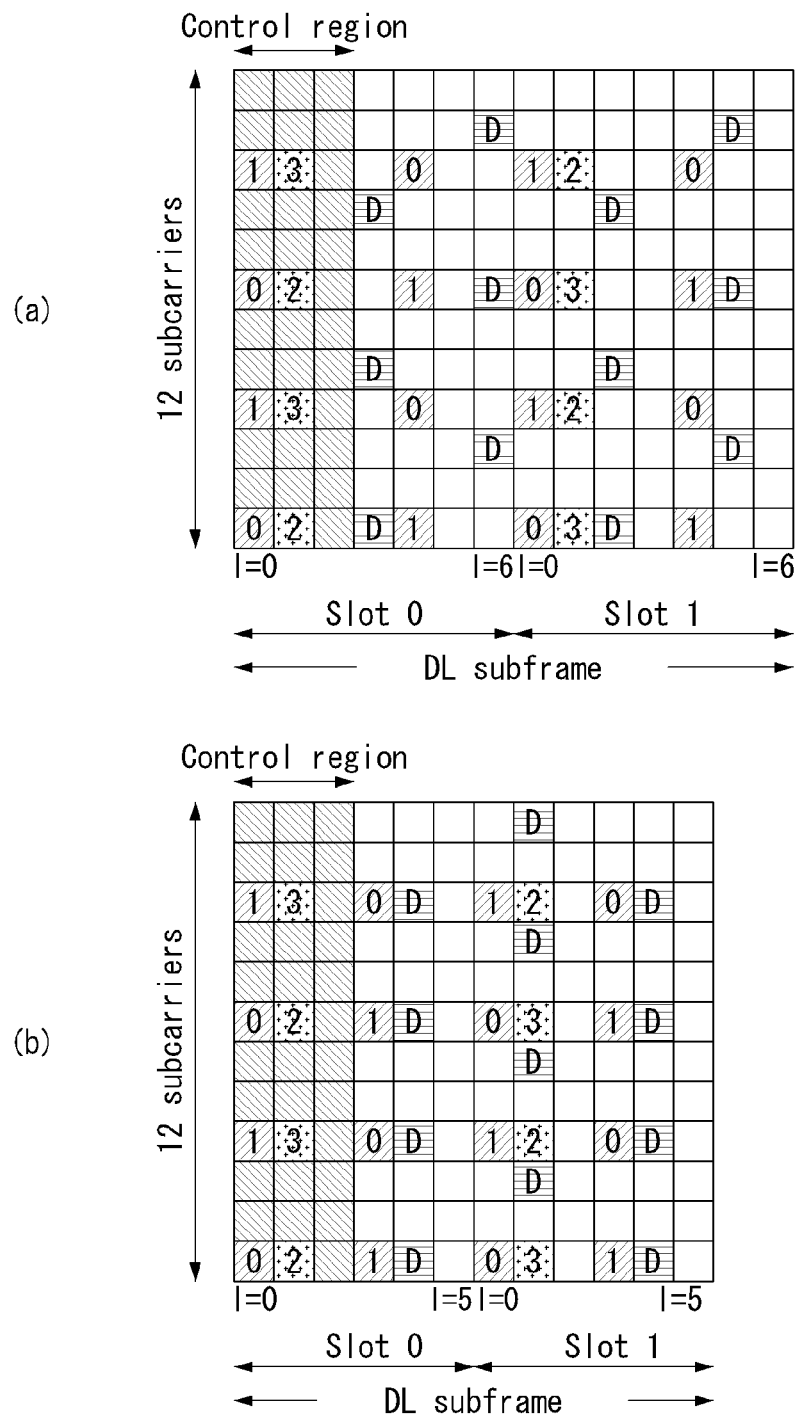
FIG. 7 illustrates reference signal patterns mapped to downlink resource block pairs in a wireless communication system to which the present invention may be applied.

FIG. 7 illustrates reference signal patterns mapped to downlink resource block pairs in a wireless communication system to which the present invention may be applied.

Referring to FIG. 7, a downlink resource block pair, that is, a unit in which a reference signal is mapped, may be represented in the form of one subframe in a time domain X 12 subcarriers in a frequency domain. That is, in a time axis (an x axis), one resource block pair has a length of 14 OFDM symbols in the case of a normal cyclic prefix (CP) (FIG. 7a) and has a length of 12 OFDM symbols in the case of an extended cyclic prefix (CP) (FIG. 7b). In the resource block lattice, resource elements (REs) indicated by "0", "1", "2", and "3" mean the locations of the CRSs of antenna port indices "0", "1", "2", and "3", respectively, and REs indicated by "D" mean the location of a DRS.

A CRS is described in more detail below. The CRS is a reference signal which is used to estimate the channel of a physical antenna and may be received by all UEs located within a cell in common. The CRS is distributed to a full frequency bandwidth. That is, the CRS is cell-specific signal and is transmitted every subframe in a wideband. Furthermore, the CRS may be used for channel quality information (CSI) and data demodulation.

A CRS is defined in various formats depending on an antenna array on the transmitting side (eNB). In the 3GPP LTE system (e.g., Release-8), an RS for a maximum four antenna ports is transmitted depending on the number of transmission antennas of an eNB. The side from which a downlink signal is transmitted has three types of antenna arrays, such as a single transmission antenna, two transmission antennas and four transmission antennas. For example, if the number of transmission antennas of an eNB is two, CRSs for a No. 0 antenna port and a No. 1 antenna port are transmitted. If the number of transmission antennas of an eNB is four, CRSs for No. 0~No. 3 antenna ports are transmitted. If the number of transmission antennas of an eNB is four, a CRS pattern in one RB is shown in FIG. 7.

If an eNB uses a single transmission antenna, reference signals for a single antenna port are arrayed.

If an eNB uses two transmission antennas, reference signals for two transmission antenna ports are arrayed using a time division multiplexing (TDM) scheme and/or a frequency division multiplexing (FDM) scheme. That is, different time resources and/or different frequency resources are allocated in order to distinguish between reference signals for two antenna ports.

Furthermore, if an eNB uses four transmission antennas, reference signals for four transmission antenna ports are arrayed using the TDM and/or FDM schemes. Channel information measured by the reception side (i.e., UE) of a downlink signal may be used to demodulate data transmitted using a transmission scheme, such as single transmission antenna transmission, transmission diversity, closed-loop spatial multiplexing, open-loop spatial multiplexing or a multi-user-multi-input/output (MIMO) antenna.

If a multi-input multi-output antenna is supported, when a RS is transmitted by a specific antenna port, the RS is transmitted in the locations of resource elements specified depending on a pattern of the RS and is not transmitted in the locations of resource elements specified for other antenna ports. That is, RSs between different antennas do not overlap.

A DRS is described in more detail below. The DRS is used to demodulate data. In multi-input multi-output antenna transmission, precoding weight used for a specific UE is combined with a transmission channel transmitted by each transmission antenna when the UE receives an RS, and is used to estimate a corresponding channel without any change.

A 3GPP LTE system (e.g., Release-8) supports a maximum of four transmission antennas, and a DRS for rank 1 beamforming is defined. The DRS for rank 1 beamforming also indicates an RS for an antenna port index 5.

In an LTE-A system, that is, an advanced and developed form of the LTE system, the design is necessary to support a maximum of eight transmission antennas in the downlink of an eNB. Accordingly, RSs for the maximum of eight transmission antennas must be also supported. In the LTE system, only downlink RSs for a maximum of four antenna ports has been defined. Accordingly, if an eNB has four to a maximum of eight downlink transmission antennas in the LTE-A system, RSs for these antenna ports must be additionally defined and designed. Regarding the RSs for the maximum of eight transmission antenna ports, the aforementioned RS for channel measurement and the aforementioned RS for data demodulation must be designed.

One of important factors that must be considered in designing an LTE-A system is backward compatibility, that is, that an LTE UE must well operate even in the LTE-A system, which must be supported by the system. From an RS transmission viewpoint, in the time-frequency domain in which a CRS defined in LTE is transmitted in a full band every subframe, RSs for a maximum of eight transmission antenna ports must be additionally defined. In the LTE-A system, if an RS pattern for a maximum of eight transmission antennas is added in a full band every subframe using the same method as the CRS of the existing LTE, RS overhead is excessively increased.

Accordingly, the RS newly designed in the LTE-A system is basically divided into two types, which include an RS having a channel measurement object for the selection of MCS or a PMI (channel state information-RS or channel state indication-RS (CSI-RS)) and an RS for the demodulation of data transmitted through eight transmission antennas (data demodulation-RS (DM-RS)).

The CSI-RS for the channel measurement object is characterized in that it is designed for an object focused on channel measurement unlike the existing CRS used for objects for measurement, such as channel measurement and handover, and for data demodulation. Furthermore, the CSI-RS may also be used for an object for measurement, such as handover. The CSI-RS does not need to be transmitted every subframe unlike the CRS because it is transmitted for an object of obtaining information about a channel state. In order to reduce overhead of a CSI-RS, the CSI-RS is intermittently transmitted on the time axis.

For data demodulation, a DM-RS is dedicatedly transmitted to a UE scheduled in a corresponding time-frequency domain. That is, a DM-RS for a specific UE is transmitted only in a region in which the corresponding UE has been scheduled, that is, in the time-frequency domain in which data is received.

In the LTE-A system, a maximum of eight transmission antennas are supported in the downlink of an eNB. In the LTE-A system, if RSs for a maximum of eight transmission antennas are transmitted in a full band every subframe using the same method as the CRS in the existing LTE, RS overhead is excessively increased. Accordingly, in the LTE-A system, an RS has been separated into the CSI-RS of the CSI measurement object for the selection of MCS or a PMI and the DM-RS for data demodulation, and thus the two RSs have been added. The CSI-RS may also be used for an object, such as RRM measurement, but has been designed for a main object for the acquisition of CSI. The CSI-RS does not need to be transmitted every subframe because it is not used for data demodulation. Accordingly, in order to reduce overhead of the CSI-RS, the CSI-RS is intermittently transmitted on the time axis. That is, the CSI-RS has a period corresponding to a multiple of the integer of one subframe and may be periodically transmitted or transmitted in a specific transmission pattern. In this case, the period or pattern in which the CSI-RS is transmitted may be set by an eNB.

For data demodulation, a DM-RS is dedicatedly transmitted to a UE scheduled in a corresponding time-frequency domain. That is, a DM-RS for a specific UE is transmitted only in the region in which scheduling is performed for the corresponding UE, that is, only in the time-frequency domain in which data is received.

In order to measure a CSI-RS, a UE must be aware of information about the transmission subframe index of the CSI-RS for each CSI-RS antenna port of a cell to which the UE belongs, the location of a CSI-RS resource element (RE) time-frequency within a transmission subframe, and a CSI-RS sequence.

In the LTE-A system, an eNB has to transmit a CSI-RS for each of a maximum of eight antenna ports. Resources used for the CSI-RS transmission of different antenna ports must be orthogonal. When one eNB transmits CSI-RSs for different antenna ports, it may orthogonally allocate the resources according to the FDM/TDM scheme by mapping the CSI-RSs for the respective antenna ports to different REs. Alternatively, the CSI-RSs for different antenna ports may be transmitted according to the CDM scheme for mapping the CSI-RSs to pieces of code orthogonal to each other.

When an eNB notifies a UE belonging to the eNB of information on a CSI-RS, first, the eNB must notify the UE of information about a time-frequency in which a CSI-RS for each antenna port is mapped. Specifically, the information includes subframe numbers in which the CSI-RS is transmitted or a period in which the CSI-RS is transmitted, a subframe offset in which the CSI-RS is transmitted, an OFDM symbol number in which the CSI-RS RE of a specific antenna is transmitted, frequency spacing, and the offset or shift value of an RE in the frequency axis.

A CSI-RS is transmitted through one, two, four or eight antenna ports. Antenna ports used in this case are p=15, p=15, 16, p=15, . . . , 18, and p=15, . . . , 22, respectively.

A CSI-RS may be defined for only a subcarrier interval Δf=15 kHz.

In a subframe configured for CSI-RS transmission, a CSI-RS sequence is mapped to a complex-valued modulation symbol a_k,l^(p) used as a reference symbol on each antenna port p as in Equation 12.

$$a_{k,l}^{(p)} = w_{l''} \cdot r_{l,n_s}(m')$$ [Equation 12]

$$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & CSI \text{ reference signal configurations 0-19, normal cyclic prefix} \\ 2l'' & CSI \text{ reference signal configurations 20-31, normal cyclic prefix} \\ l'' & CSI \text{ reference signal configurations 0-27, extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 12, (k',l') (wherein k' is a subcarrier index within a resource block and l' indicates an OFDM symbol index within a slot.) and the condition of n_s is determined depending on a CSI-RS configuration, such as Table 3 or Table 4.

Table 3 illustrates the mapping of (k',l') from a CSI-RS configuration in a normal CP.

TABLE 3

| | CSI reference signal configuration | Number of CSI reference signals configured | | | | | |
|---|---|---|---|---|---|---|---|
| | | 1 or 2 | | 4 | | 8 | |
| | | (k', l') | $n_s \mod 2$ | (k', l') | $n_s \mod 2$ | (k', l') | $n_s \mod 2$ |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |

TABLE 3-continued

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Table 4 illustrates the mapping of (k',l') from a CSI-RS configuration in an extended CP.

TABLE 4

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Referring to Table 3 and Table 4, in the transmission of a CSI-RS, in order to reduce inter-cell interference (ICI) in a multi-cell environment including a heterogeneous network (HetNet) environment, a maximum of 32 different configurations (in the case of a normal CP) or a maximum of 28 different configurations (in the case of an extended CP) are defined.

The CSI-RS configuration is different depending on the number of antenna ports and a CP within a cell, and a neighboring cell may have a maximum of different configurations. Furthermore, the CSI-RS configuration may be divided into a case where it is applied to both an FDD frame and a TDD frame and a case where it is applied to only a TDD frame depending on a frame structure.

(k',l') and n_s are determined depending on a CSI-RS configuration based on Table 3 and Table 4, and time-frequency resources used for CSI-RS transmission are determined depending on each CSI-RS antenna port.

Figure 8:
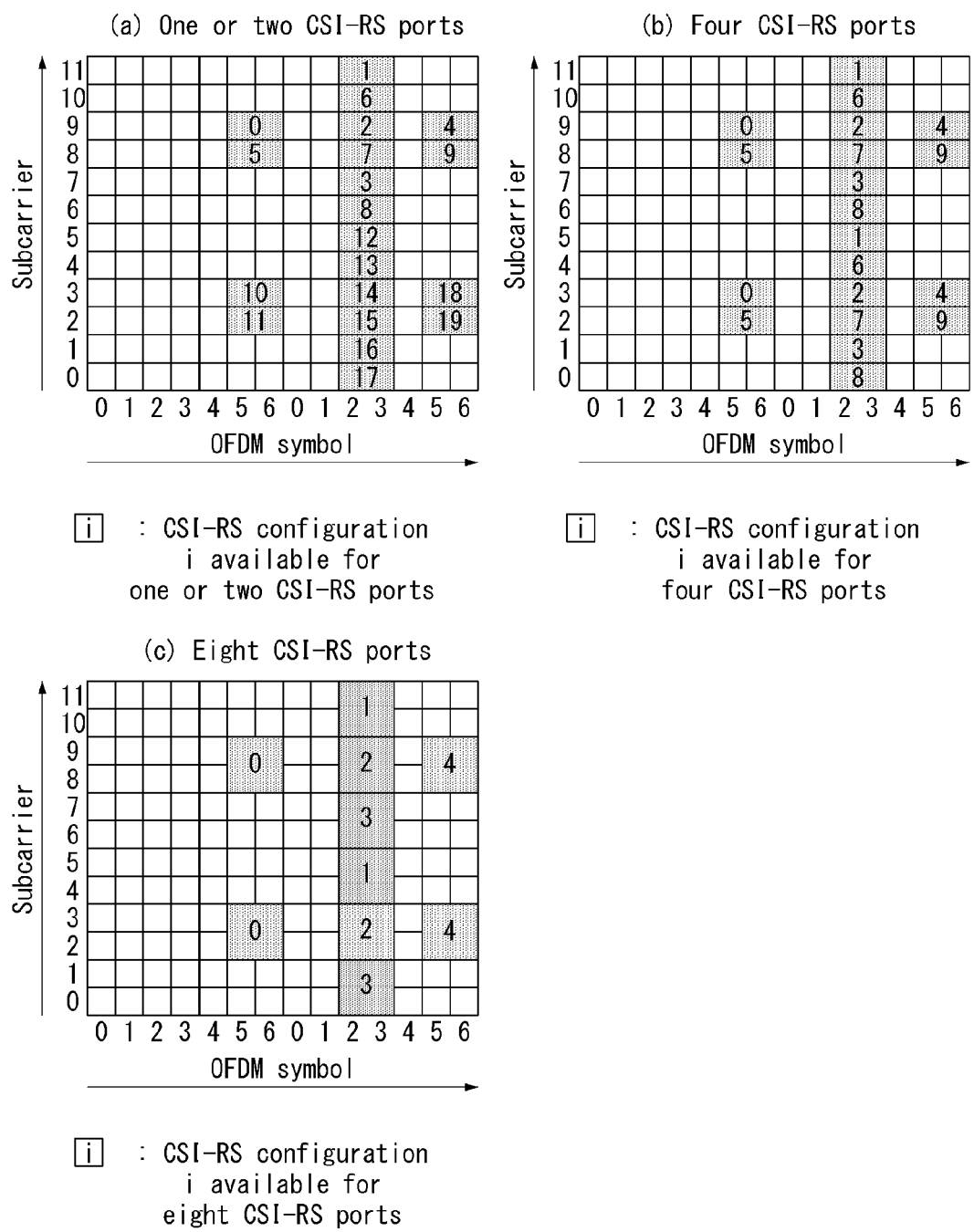
FIG. 8 is a diagram illustrating resources to which reference signals are mapped in a wireless communication system to which the present invention may be applied.

FIG. 8 is a diagram illustrating resources to which reference signals are mapped in a wireless communication system to which the present invention may be applied.

FIG. 8(a) shows twenty types of CSI-RS configurations available for CSI-RS transmission by one or two CSI-RS antenna ports, FIG. 8(b) shows ten types of CSI-RS configurations available for four CSI-RS antenna ports, and FIG. 8(c) shows five types of CSI-RS configurations available for eight CSI-RS antenna ports.

As described above, radio resources (i.e., an RE pair) in which a CSI-RS is transmitted are determined depending on each CSI-RS configuration.

If one or two antenna ports are configured for CSI-RS transmission with respect to a specific cell, the CSI-RS is transmitted on radio resources on a configured CSI-RS configuration of the twenty types of CSI-RS configurations shown in FIG. 8(a).

Likewise, when four antenna ports are configured for CSI-RS transmission with respect to a specific cell, a CSI-RS is transmitted on radio resources on a configured CSI-RS configuration of the ten types of CSI-RS configurations shown in FIG. 8(b). Furthermore, when eight antenna ports are configured for CSI-RS transmission with respect to a specific cell, a CSI-RS is transmitted on radio resources on a configured CSI-RS configuration of the five types of CSI-RS configurations shown in FIG. 8(c).

A CSI-RS for each antenna port is subjected to CDM for every two antenna ports (i.e., {15,16}, {17,18}, {19,20} and {21,22}) on the same radio resources and transmitted. For example, in the case of antenna ports 15 and 16, CSI-RS complex symbols for the respective antenna ports 15 and 16 are the same, but are multiplied by different types of orthogonal code (e.g., Walsh code) and mapped to the same radio resources. The complex symbol of the CSI-RS for the antenna port 15 is multiplied by [1, 1], and the complex symbol of the CSI-RS for the antenna port 16 is multiplied by [1-1] and mapped to the same radio resources. The same is true of the antenna ports {17,18}, {19,20} and {21,22}.

A UE may detect a CSI-RS for a specific antenna port by multiplying code by which a transmitted symbol has been multiplied. That is, a transmitted symbol is multiplied by the code [1 1] multiplied in order to detect the CSI-RS for the antenna port 15, and a transmitted symbol is multiplied by the code [1−1] multiplied in order to detect the CSI-RS for the antenna port 16.

Referring to FIGS. 8(a) to 8(c), in the case of the same CSI-RS configuration index, radio resources according to a CSI-RS configuration having a large number of antenna ports include radio resources having a small number of CSI-RS antenna ports. For example, in the case of a CSI-RS configuration 0, radio resources for the number of eight antenna ports include both radio resources for the number of four antenna ports and radio resources for the number of one or two antenna ports.

A plurality of CSI-RS configurations may be used in one cell. 0 or one CSI-RS configuration may be used for a non-zero power (NZP) CSI-RS, and 0 or several CSI-RS configurations may be used for a zero power (ZP) CSI-RS.

For each bit set to 1 in a zeropower (ZP) CSI-RS ('ZeroPowerCSI-RS') that is a bitmap of 16 bits configured by a high layer, a UE assumes zero transmission power in REs (except a case where an RE overlaps an RE assuming a NZP CSI-RS configured by a high layer) corresponding to the four CSI-RS columns of Table 3 and Table 4. The most significant bit (MSB) corresponds to the lowest CSI-RS configuration index, and next bits in the bitmap sequentially correspond to next CSI-RS configuration indices.

A CSI-RS is transmitted only in a downlink slot that satisfies the condition of (n_s mod 2) in Table 3 and Table 4 and a subframe that satisfies the CSI-RS subframe configurations.

In the case of the frame structure type 2 (TDD), a CSI-RS is not transmitted in a special subframe, a synchronization signal (SS), a subframe colliding against a PBCH or SystemInformationBlockType1 (SIB 1) Message transmission or a subframe configured to paging message transmission.

Furthermore, an RE in which a CSI-RS for any antenna port belonging to an antenna port set S (S={15}, S={15,16}, S={17,18}, S={19,20} or S={21,22}) is transmitted is not used for the transmission of a PDSCH or for the CSI-RS transmission of another antenna port.

Time-frequency resources used for CSI-RS transmission cannot be used for data transmission. Accordingly, data throughput is reduced as CSI-RS overhead is increased. By considering this, a CSI-RS is not configured to be transmitted every subframe, but is configured to be transmitted in each transmission period corresponding to a plurality of subframes. In this case, CSI-RS transmission overhead can be significantly reduced compared to a case where a CSI-RS is transmitted every subframe.

A subframe period (hereinafter referred to as a "CSI transmission period") T_CSI-RS and a subframe offset L. CSI-RS for CSI-RS transmission are shown in Table 5.

Table 5 illustrates CSI-RS subframe configurations.

TABLE 5

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
| --- | --- | --- |
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Referring to Table 5, the CSI-RS transmission period T_CSI-RS and the subframe offset Δ_CSI-RS are determined depending on the CSI-RS subframe configuration I_CSI-RS.

The CSI-RS subframe configuration of Table 5 may be configured as one of the aforementioned 'SubframeConfig' field and 'zeroTxPowerSubframeConfig' field. The CSI-RS subframe configuration may be separately configured with respect to an NZP CSI-RS and a ZP CSI-RS.

A subframe including a CSI-RS satisfies Equation 13.

[Equation 13]

$$(10n_f + \lfloor n_s/2 \rfloor - \Delta_{CSI-RS}) \bmod T_{CSI-RS} = 0$$

In Equation 13, T_CSI-RS means a CSI-RS transmission period, Δ_CSI-RS means a subframe offset value, n_f means a system frame number, and n_s means a slot number.

In the case of a UE in which the transmission mode 9 has been configured with respect to a serving cell, one CSI-RS resource configuration may be configured for the UE. In the case of a UE in which the transmission mode 10 has been configured with respect to a serving cell, one or more CSI-RS resource configuration (s) may be configured for the UE.

In the current LTE standard, a CSI-RS configuration includes an antenna port number (antennaPortsCount), a subframe configuration (subframeConfig), and a resource configuration (resourceConfig). Accordingly, the CSI-RS configuration provides notification that a CSI-RS is transmitted how many antenna port, provides notification of the period and offset of a subframe in which a CSI-RS will be transmitted, and provides notification that a CSI-RS is transmitted in which RE location (i.e., a frequency and OFDM symbol index) in a corresponding subframe.

Specifically, the following parameters for each CSI-RS (resource) configuration are configured through high layer signaling.

If the transmission mode 10 has been configured, a CSI-RS resource configuration identifier A CSI-RS port number (antennaPortsCount): a parameter (e.g., one CSI-RS port, two CSI-RS ports, four CSI-RS ports or eight CSI-RS ports) indicative of the number of antenna ports used for CSI-RS transmission A CSI-RS configuration (resourceConfig) (refer to Table 3 and Table 4): a parameter regarding a CSI-RS allocation resource location A CSI-RS subframe configuration (subframeConfig, that is, I_CSI-RS) (refer to Table 5): a parameter regarding the period and/or offset of a subframe in which a CSI-RS will be transmitted If the transmission mode 9 has been configured, transmission power P_C for CSI feedback: in relation to the assumption of a UE for reference PDSCH transmission power for feedback, when the UE derives CSI feedback and takes a value within a [−8, 15] dB range in a 1-dB step size, P_C is assumed to be the ratio of energy per resource element (EPRE) per PDSCH RE and a CSI-RS EPRE.

If the transmission mode 10 has been configured, transmission power P_C for CSI feedback with respect to each CSI process. If CSI subframe sets C_CSI,0 and C_CSI,1 are configured by a high layer with respect to a CSI process, P_C is configured for each CSI subframe set in the CSI process.

A pseudo-random sequence generator parameter n_ID

If the transmission mode 10 has been configured, a high layer parameter 'qcl-CRS-Info-r11' including a QCL scrambling identifier for a quasi co-located (QCL) type B UE assumption (qct-ScramblingIdentity-r11), a CRS port count (crs-PortsCount-r11), and an MBSFN subframe configuration list (mbsfn-SubframeConfigList-r11) parameter.

When a CSI feedback value derived by a UE has a value within the [−8, 15] dB range, P_C is assumed to be the ration of PDSCH EPRE to CSI-RS EPRE. In this case, the PDSCH EPRE corresponds to a symbol in which the ratio of PDSCH EPRE to CRS EPRE is $\rho\_A$.

A CSI-RS and a PMCH are not configured in the same subframe of a serving cell at the same time.

In the frame structure type 2, if four CRS antenna ports have been configured, a CSI-RS configuration index belonging to the [20-31] set (refer to Table 3) in the case of a normal CP or a CSI-RS configuration index belonging to the [16-27] set (refer to Table 4) in the case of an extended CP is not configured in a UE.

A UE may assume that the CSI-RS antenna port of a CSI-RS resource configuration has a QCL relation with delay spread, Doppler spread, Doppler shift, an average gain and average delay.

A UE in which the transmission mode 10 and the QCL type B have been configured may assume that antenna ports 0-3 corresponding to a CSI-RS resource configuration and antenna ports 15-22 corresponding to a CSI-RS resource configuration have QCL relation with Doppler spread and Doppler shift.

In the case of a UE in which the transmission modes 1-9 have been configured, one ZP CSI-RS resource configuration may be configured in the UE with respect to a serving cell. In the case of a UE in which the transmission mode 10 has been configured, one or more ZP CSI-RS resource configurations may be configured in the UE with respect to a serving cell.

The following parameters for a ZP CSI-RS resource configuration may be configured through high layer signaling.

The ZP CSI-RS configuration list (zeroTxPowerResourceConfigList) (refer to Table 3 and Table 4): a parameter regarding a zero-power CSI-RS configuration The ZP CSI-RS subframe configuration (eroTxPowerSubframeConfig, that is, I_CSI-RS) (refer to Table 5): a parameter regarding the period and/or offset of a subframe in which a zero-power CSI-RS is transmitted A ZP CSI-RS and a PMCH are not configured in the same subframe of a serving cell at the same time.

In the case of a UE in which the transmission mode 10 has been configured, one or more channel state information—interference measurement (CSI-IM) resource configurations may be configured in the UE with respect to a serving cell.

The following parameters for each CSI-IM resource configuration may be configured through high layer signaling.

The ZP CSI-RS configuration (refer to Table 3 and Table 4)

The ZP CSI RS subframe configuration I_CSI-RS (refer to Table 5)

A CSI-IM resource configuration is the same as any one of configured ZP CSI-RS resource configurations.

A CSI-IM resource and a PMCH are not configured within the same subframe of a serving cell at the same time.

Massive MIMO

A MIMO system having a plurality of antennas may be called a massive MIMO system and has been in the spotlight as means for improving spectrum efficiency, energy efficiency and processing complexity.

In recent 3GPP, in order to satisfy the requirements of spectrum efficiency for a future mobile communication system, a discussion about the massive MIMO system has started. The massive MIMO is also called full-dimension MIMO (FD-MIMO).

In a wireless communication system after LTE Release (Rel)-12, the introduction of an active antenna system (AAS) is considered.

Unlike the existing passive antenna system in which an amplifier and antenna capable of adjusting the phase and size of a signal have been separated, the AAS means a system in which each antenna is configured to include an active element, such as an amplifier.

The AAS does not require a separate cable, connector and other hardware for connecting an amplifier and an antenna because the active antenna is used, and thus has a high efficiency characteristic in terms of energy and operating costs. In particular, the AAS enables an advanced MIMO technology, such as the formation of an accurate beam pattern or 3D beam pattern in which a beam direction and a beam width are considered because the AAS supports each electronic beam control method.

Due to the introduction of an advanced antenna system, such as the AAS, a massive MIMO structure having a plurality of input/output antennas and a multi-dimension antenna structure is also considered. For example, unlike in the existing straight type antenna array, if a two-dimensional (2D) antenna array is formed, a 3D beam pattern can be formed by the active antenna of the AAS.

Figure 9:
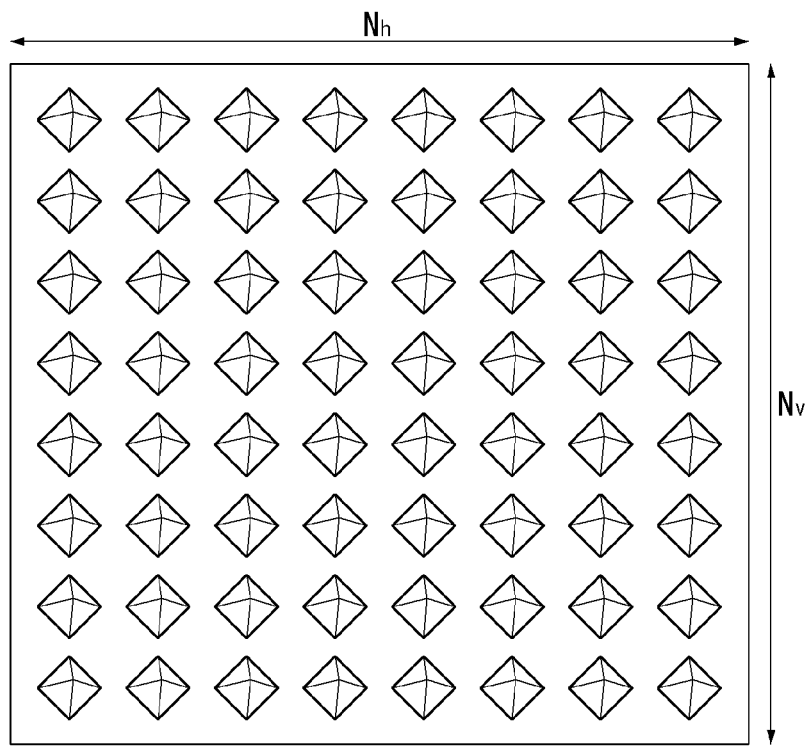
FIG. 9 illustrates a 2D-AAS having 64 antenna elements in a wireless communication system to which the present invention may be applied.

FIG. 9 illustrates a 2D-AAS having 64 antenna elements in a wireless communication system to which the present invention may be applied.

FIG. 9 illustrates a common 2D antenna array. A case where $N\_t = N\_v \cdot N\_h$ antennas has a square form as in FIG. 9 may be considered. In this case, N_h indicates the number of antenna columns in a horizontal direction, and N_v indicates the number of antenna rows in a vertical direction.

If the antenna array of such a 2D structure is used, radio waves can be controlled both in the vertical direction (elevation) and the horizontal direction (azimuth) so that a transmission beam can be controlled in the 3D space. A wavelength control mechanism of such a type may be called 3D beamforming.

Figure 10:
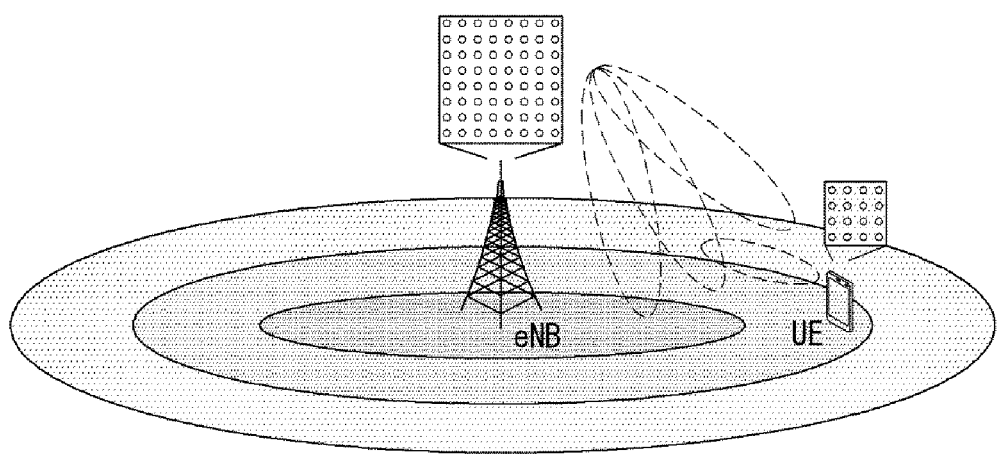
FIG. 10 illustrates a system in which an eNB or UE has a plurality of transmission/reception antennas capable of forming a 3D beam based on the AAS in a wireless communication system to which the present invention may be applied.

FIG. 10 illustrates a system in which an eNB or UE has a plurality of transmission/reception antennas capable of forming a 3D beam based on the AAS in a wireless communication system to which the present invention may be applied.

FIG. 10 is a diagram of the aforementioned example and illustrates a 3D MIMO system using a 2D antenna array (i.e., 2D-AAS).

From the point of view of a transmission antenna, if a 3D beam pattern is used, a semi-static or dynamic beam can be formed in the vertical direction of the beam in addition to the horizontal direction. For example, an application, such as the formation of a sector in the vertical direction, may be considered.

Furthermore, from the point of view of a reception antenna, when a reception beam is formed using a massive reception antenna, a signal power rise effect according to an antenna array gain may be expected. Accordingly, in the case of the uplink, an eNB can receive a signal from a UE through a plurality of antennas. In this case, there is an advantage in that the UE can set its transmission power very low by considering the gain of the massive reception antenna in order to reduce an interference influence.

Figure 11:
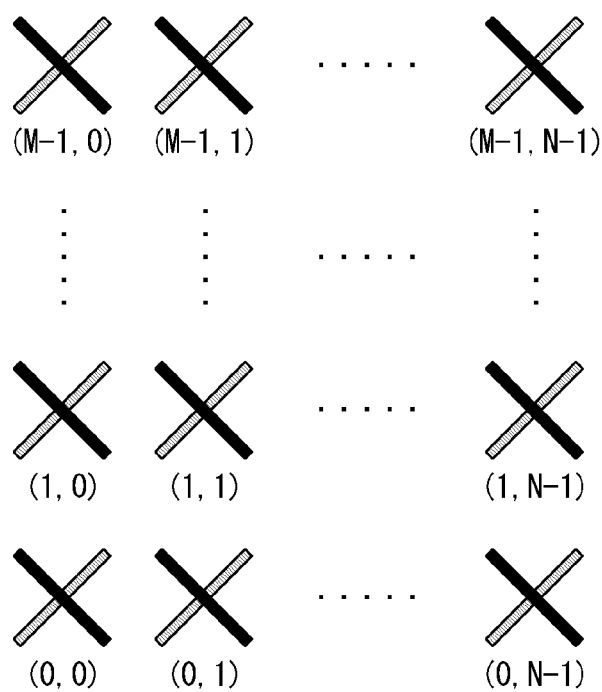
FIG. 11 illustrates a 2D antenna system having cross-polarizations in a wireless communication system to which the present invention may be applied.

FIG. 11 illustrates a 2D antenna system having cross-polarizations in a wireless communication system to which the present invention may be applied.

A 2D planar antenna array model in which polarization is considered may be diagrammed as shown in FIG. 11.

Unlike the existing MIMO system according to a passive antenna, a system based on an active antenna can dynamically control the gain of an antenna element by applying weight to an active element (e.g., an amplifier) to which each antenna element has been attached (or included). The antenna system may be modeled in an antenna element level because a radiation pattern depends on the number of antenna elements and an antenna arrangement, such as antenna spacing.

An antenna array model, such as the example of FIG. 11, may be represented by (M, N, P). This corresponds to a parameter that characterizes an antenna array structure.

M indicates the number of antenna elements having the same polarization in each column (i.e., the vertical direction) (i.e., the number of antenna elements having a +45° slant in each column or the number of antenna elements having a −45° slant in each column).

N indicates the number of columns in the horizontal direction (i.e., the number of antenna elements in the horizontal direction).

P indicates the number of dimensions of polarization. P=2 in the case of cross-polarization as in the case of FIG. 11, or P=1 in the case of co-polarization.

An antenna port may be mapped to a physical antenna element. The antenna port may be defined by a reference signal related to a corresponding antenna port. For example, in the LTE system, the antenna port 0 may be related to a cell-specific reference signal (CRS), and the antenna port 6 may be related to a positioning reference signal (PRS).

For example, an antenna port and a physical antenna element may be mapped in a one-to-one manner. This may correspond to a case where a single cross-polarization antenna element is used for downlink MIMO or downlink transmit diversity. For example, the antenna port 0 is mapped to one physical antenna element, whereas the antenna port 1 may be mapped to the other physical antenna element. In this case, from the point of view of a UE, two types of downlink transmission are present. One is related to a reference signal for the antenna port 0, and the other is related to a reference signal for the antenna port 1.

For another example, a single antenna port may be mapped to multiple physical antenna elements. This may correspond to a case where a single antenna port is used for beamforming. In beamforming, multiple physical antenna elements are used, so downlink transmission may be directed toward a specific UE. In general, this may be achieved using an antenna array configured using multiple columns of multiple cross-polarization antenna elements. In this case, from the point of view of a UE, one type of downlink transmission generated from a single antenna port is present. One is related to a CRS for the antenna port 0, and the other is related to a CRS for the antenna port 1.

That is, an antenna port indicates downlink transmission from the point of view of a UE not actual downlink transmission from a physical antenna element by an eNB.

For another example, a plurality of antenna ports is used for downlink transmission, but each antenna port may be mapped to multiple physical antenna elements. This may correspond to a case where an antenna array is used for downlink MIMO or downlink diversity. For example, each of the antenna ports 0 and 1 may be mapped to multiple physical antenna elements. In this case, from the point of view of a UE, two types of downlink transmission. One is related to a reference signal for the antenna port 0, and the other is related to a reference signal for the antenna port 1.

In FD-MIMO, the MIMO precoding of a data stream may experience antenna port virtualization, transceiver unit (or a transmission and reception unit) (TXRU) virtualization, and an antenna element pattern.

In the antenna port virtualization, a stream on an antenna port is precoded on a TXRU. In the TXRU virtualization, a TXRU signal is precoded on an antenna element. In the antenna element pattern, a signal radiated by an antenna element may have a directional gain pattern.

In the existing transceiver modeling, a static one-to-one mapping between an antenna port and a TXRU is assumed, and a TXRU virtualization effect is joined into a static (TXRU) antenna pattern including the effects of the TXRU virtualization and the antenna element pattern.

The antenna port virtualization may be performed by a frequency-selective method. In LTE, an antenna port, together with a reference signal (or pilot), is defined. For example, for precoded data transmission on an antenna port, a DMRS is transmitted in the same bandwidth as a data signal, and both the DMRS and data are precoded by the same precoder (or the same TXRU virtualization precoding). For CSI measurement, a CSI-RS is transmitted through multiple antenna ports. In CSI-RS transmission, a precoder that characterizes mapping between a CSI-RS port and a TXRU may be designed in a unique matrix so that a UE can estimate a TXRU virtualization precoding matrix for a data precoding vector.

A TXRU virtualization method is discussed in 1D TXRU virtualization and 2D TXRU virtualization, which are described below with reference to the following drawing.

Figure 12:
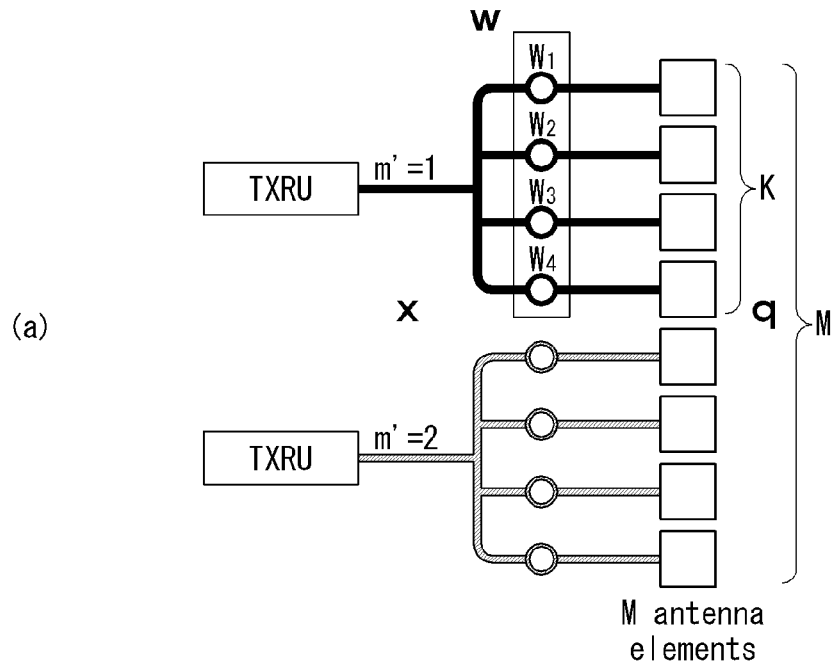
FIG. 12 illustrates a transceiver unit model in a wireless communication system to which the present invention may be applied.
Figure 12:
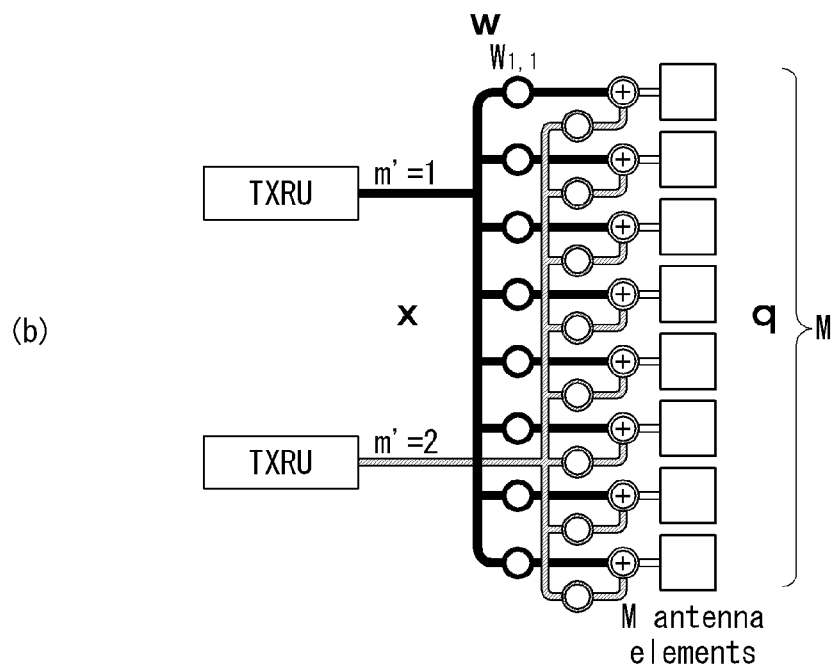

FIG. 12 illustrates a transceiver unit model in a wireless communication system to which the present invention may be applied.

In the 1D TXRU virtualization, M_TXRU TXRUs are related to M antenna elements configured in a single column antenna array having the same polarization.

In the 2D TXRU virtualization, a TXRU model configuration corresponding to the antenna array model configuration (M, N, P) of FIG. 11 may be represented by (M_TXRU, N, P). In this case, M_TXRU means the number of TXRUs present in the 2D same column and same polarization, and always satisfies M_TXRU M. That is, the total number of TXRUs is the same as M_TXRU×N×P.

A TXRU virtualization model may be divided into a TXRU virtualization model option-1: sub-array partition model as in FIG. 12(a) and a TXRU virtualization model option-2: full connection model as in FIG. 12(b) depending on a correlation between an antenna element and a TXRU.

Referring to FIG. 12(a), in the case of the sub-array partition model, an antenna element is partitioned into multiple antenna element groups, and each TXRU is connected to one of the groups.

Referring to FIG. 12(b), in the case of the full-connection model, the signals of multiple TXRUs are combined and transferred to a single antenna element (or the arrangement of antenna elements).

In FIG. 12, q is the transmission signal vectors of antenna elements having M co-polarizations within one column. W is a wideband TXRU virtualization vector, and W is a wideband TXRU virtualization matrix. X is the signal vectors of M_TXRU TXRUs.

In this case, mapping between an antenna port and TXRUs may be one-to-one or one-to-many.

In FIG. 12, mapping between a TXRU and an antenna element (TXRU-to-element mapping) shows one example, but the present invention is not limited thereto. From the point of view of hardware, the present invention may be identically applied to mapping between an TXRU and an antenna element which may be implemented in various forms.

Unlink Reference Signal

Figure 13:
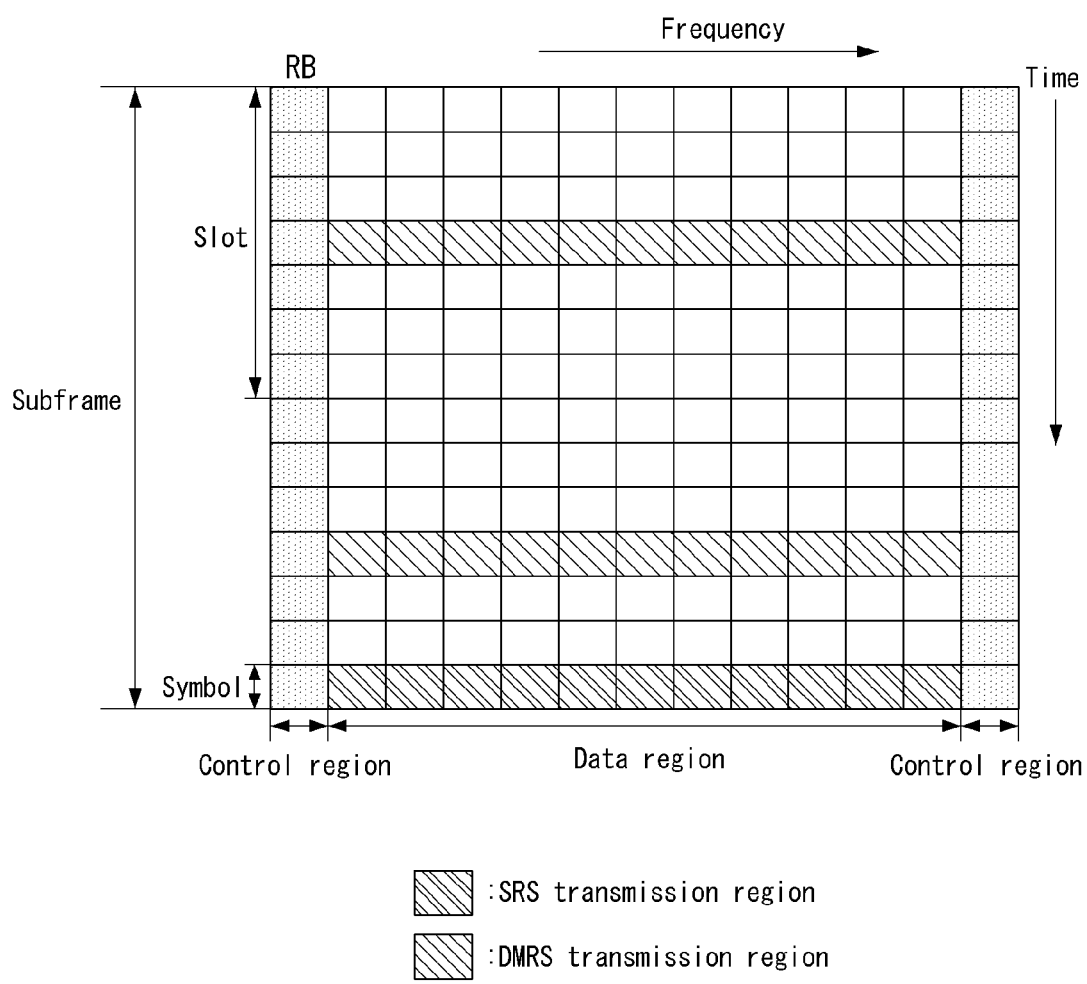
FIG. 13 illustrates a structure of an uplink subframe in a wireless communication system to which the present invention may be applied.

FIG. 13 illustrates a structure of an uplink subframe in a wireless communication system to which the present invention may be applied.

Referring to FIG. 13, a UE may transmit a Sounding Reference Signal (SRS) periodically or non-periodically to estimate a channel for an uplink band (sub-band) other than the band to which a PUSCH is transmitted or obtain information of a channel corresponding to the whole uplink bandwidth (wide band).

When an SRS is transmitted periodically, the corresponding period may be determined through an upper layer signal. Transmission of an aperiodic SRS may be indicated by an eNB by using an 'SRS request' field having a PDCCH uplink/downlink DCI format, or a triggering message may be transmitted to start the transmission.

As shown in FIG. 13, the region to which an SRS may be transmitted within one subframe is the last region on the time axis, which contains SC-FDMA symbols. SRSs from different UEs transmitted to the last SC-FDMA symbol of the same subframe may be distinguished from each other according to their frequency position. Differently from the PUSCH, the Discrete Fourier Transform (DTF) for transformation into SC-FDMA signals is not performed on the SRSs, which are transmitted directly without employing a precoding matrix.

Furthermore, the region to which a Demodulation Reference Signal (DMRS) for PUSCH may be transmitted within one subframe is a central region of each slot on the time axis, which contains SC-FDMA symbols; in the same manner, an SRS is transmitted through a data transmission band of the frequency domain. For example, as shown in FIG. 13, in a subframe for which a normal CP is applied, a DMRS is transmitted to the fourth and the 11-th SC-FDMA symbol. On the other hand, in a subframe for which an extended CP is applied, a DMRS is transmitted to the third and the ninth SC-FDMA symbol.

A DMRS may be combined with transmission of a PUSCH or a PUCCH. An SRS is a reference signal that a UE transmits to an eNB for uplink scheduling. An eNB estimates an uplink channel through the received SRS and uses the estimated uplink channel for uplink scheduling. The SRS is not combined with transmission of the PUCCH or the PUCCH. A base sequence of the same type may be used for the DMRS and the SRS. Meanwhile, precoding applied to the DMRS for uplink multi-antenna transmission may be the same as one applied for the PUSCH.

Two types of uplink reference signals are supported:
DMRS associated with transmission of a PUSCH or a PUCCH
SRS not associated with transmission of a PUSCH or a PUCCH The same set of the base sequence is used in the same manner for the DMRS and the SRS.

A reference signal sequence, $r_{u,v}^{(\alpha)}(n)$, is defined by using the cyclic shift $\alpha$ of the base sequence $\bar{r}_{u,v}(n)$ as shown in Equation 14 below.

$$r_{u,v}^{(\alpha)}(n)=e^{j\alpha n}\bar{r}_{u,v}(n), 0\leq n<M_{sc}^{RS} \qquad \text{[Equation 14]}$$

In Equation 14, the length of a reference signal sequence is $M_{sc}^{RS}=mN_{sc}^{RB}$. Here, $N_{sc}^{RB}$ denotes the size of a resource block in the frequency region and is expressed by the number of subcarriers. And m is $1 \leq m \leq N_{RB}^{max,UL}$.

Multiple reference signal sequences are generated from a single base sequence by applying different cyclic shift values of $\alpha$.

A base sequence $\bar{r}_{u,v}(n)$ is distinguished by its group number. Here, $u \in \{0, 1, \ldots, 29\}$ denotes a group number, and v denotes a base sequence number within the group.

Each group comprises one base sequence (v=0) having a length of $M_{sc}^{RS}=mN_{sc}^{RB}$ ($1 \leq m \leq 5$) and two base sequences (v=0,1) each of which having a length of $M_{sc}^{RS}=mN_{sc}^{RB}$ ($6 \leq m \leq N_{RB}^{max,UL}$). A base sequence $(\bar{r}_{u,v}(0), \ldots, \bar{r}_{u,v}(M_{sc}^{RS}-1))$ is defined differently according to the length of the sequence, $M_{sc}^{RS}$.

1) When the length of a base sequence is equal to or larger than $3N_{sc}^{RB}$ ($M_{sc}^{RS} \geq 3N_{sc}^{RB}$), the base sequence $(\bar{r}_{u,v}(0), \ldots, \bar{r}_{u,v}(M_{sc}^{RS}-1))$ is defined by Equation 15 as follows.

$$\bar{r}_{u,v}(n)=x_q(n \bmod N_{ZC}^{RS}), 0 \leq n < M_{sc}^{RS} \qquad \text{[Equation 15]}$$

In Equation 15, the length of a Zadoff-Chu (ZC) sequence, $N_{ZC}^{RS}$, is determined by the maximum prime number which satisfies a condition that $N_{ZC}^{RS} < M_{sc}^{RS}$.

The q-th root Zadoff-Chu (ZC) sequence is defined by Equation 16 below.

$$x_q(m) = e^{-j\frac{\pi q m(m+1)}{N_{ZC}^{RS}}}, 0 \leq m \leq N_{ZC}^{RS}-1 \qquad \text{[Equation 16]}$$

$$q = \lfloor \bar{q} + 1/2 \rfloor + v \cdot (-1)^{\lfloor 2\bar{q} \rfloor}$$

$$\bar{q} = N_{ZC}^{RS} \cdot (u+1)/31$$

2) When the length of a base sequence is less than $3N_{sc}^{RB}$ ($M_{sc}^{RS}=N_{sc}^{RB}$ or $M_{sc}^{RS}=2N_{sc}^{RB}$), the base sequence is defined by Equation 17 below.

$$\bar{r}_{u,v}(n)=e^{j\varphi(n)\pi/4}, 0 \leq n \leq M_{sc}^{RS}-1 \quad \text{[Equation 17]}$$

When $M_{sc}^{RS}=N_{sc}^{RB}$, $\varphi(n)$ of Equation 17 is defined as shown in Table 6 below for each base sequence group.

TABLE 6

| u | $\varphi(0), \ldots, \varphi(11)$ |
|---|---|
| 0  | -1  1  3 -3  3  3  1  1  3  1 -3  3 |
| 1  |  1  1  3  3  3 -1  1 -3 -3  1 -3  3 |
| 2  |  1  1 -3 -3 -3 -1 -3 -3  1 -3  1 -1 |
| 3  | -1  1  1  1  1 -3 -3  1 -3  3 -1  1 |
| 4  | -1  3  1 -1  1 -1 -3 -1  1 -1  1  3 |
| 5  |  1 -3  3 -1 -1  1  1 -1 -1  3 -3  1 |
| 6  | -1  3 -3 -3 -3  3  1 -1  3  3 -3  1 |
| 7  | -3 -1 -1 -1  1 -3  3 -1  1 -3  3  1 |
| 8  |  1 -3  3  1 -1 -1 -1  1  1  3 -1  1 |
| 9  |  1 -3 -1  3  3 -1 -3  1  1  1  1  1 |
| 10 | -1  3 -1  1  1 -3 -3 -1 -3 -3  3 -1 |
| 11 |  3  1 -1 -1  3  3 -3  1  3  1  3  3 |

TABLE 6-continued

| u | $\varphi(0), \ldots, \varphi(11)$ |
|---|---|
| 12 |  1 -3  1  1 -3  1  1  1 -3 -3 -3  1 |
| 13 |  3  3 -3  3 -3  1  1  3 -1 -3  3  3 |
| 14 | -3  1 -1 -3 -1  3  1  3  3  3 -1  1 |
| 15 |  3 -1  1 -3 -1 -1  1  1  3  1 -1 -3 |
| 16 |  1  3  1 -1  1  3  3  3 -1 -1  3 -1 |
| 17 | -3  1  1  3 -3  3 -3 -3  3  1  3 -1 |
| 18 | -3  3  1  1 -3  1 -3 -3 -1 -1  1 -3 |
| 19 | -1  3  1  3  1 -1 -1  3 -3 -1 -3 -1 |
| 20 | -1 -3  1  1  1  1  3  1 -1  1 -3 -1 |
| 21 | -1  3 -1  1 -3 -3 -3 -3 -3  1 -1 -3 |
| 22 |  1  1 -3 -3 -3 -3 -1  3 -3  1 -3  3 |
| 23 |  1  1 -1 -3 -1 -3  1 -1  1  3 -1  1 |
| 24 |  1  1  3  1  3  3 -1  1 -1 -3 -3  1 |
| 25 |  1 -3  3  3  1  3  3  1 -3 -1 -1  3 |
| 26 |  1  3 -3 -3  3 -3  1 -1 -1  3 -1 -3 |
| 27 | -3 -1 -3 -1 -3  3  1 -1  1  3 -3 -3 |
| 28 | -1  3 -3  3 -1  3  3 -3  3  3 -1 -1 |
| 29 |  3 -3 -3 -1 -1 -3 -1  3 -3  3  1 -1 |

When $M_{sc}^{RS}=2N_{sc}^{RB}$, $\varphi(n)$ of Equation 17 is defined as shown in Table 7 below for each base sequence group.

TABLE 7

| u | $\varphi(0), \ldots, \varphi(23)$ |
|---|---|
| 0  | -1  3  1 -3  3 -1  1  3 -3  3  1  3 -3  3  1  1 -1  1  3 -3  3 -3 -1 -3 |
| 1  | -3  3 -3 -3 -3  1 -3 -3  3 -1  1  1  1  3  1 -1  3 -3 -3  1  3  1  1 -3 |
| 2  |  3 -1  3  3  1  1 -3  3  3  3  3  1 -1  3 -1  1  1 -1 -3 -1 -1  1  3  3 |
| 3  | -1 -3  1  1  3 -3  1  1 -3 -1 -1  1  3  1  3  1 -1  3  1  1 -3 -1 -3 -1 |
| 4  | -1 -1 -1 -3 -3 -1  1  1  3  3 -1  3 -1  1 -1 -3  1 -1 -3 -3  1 -3 -1 -1 |
| 5  | -3  1  1  3 -1  1  3  1 -3  1 -3  1  1 -1 -1  3 -1 -3  3 -3 -3 -3  1  1 |
| 6  |  1  1 -1 -1  3 -3 -3  3 -3  1 -1 -1  1 -1  1  1 -1 -3 -1  1 -1  3 -1 -3 |
| 7  | -3  3  3 -1 -1 -3 -1  3  1  3  1  3  1  1 -1  3  1 -1  1  3 -3 -1 -1  1 |
| 8  | -3  1  3 -3  1 -1 -3  3 -3  3 -1 -1 -1 -1  1 -3 -3 -3  1 -3 -3 -3  1 -3 |
| 9  |  1  1 -3  3  3 -1 -3 -1  3 -3  3  3  3 -1  1  1 -3  1 -1  1  1 -3  1  1 |
| 10 | -1  1 -3 -3  3 -1  3 -1 -1 -3 -3 -3 -1 -3 -3  1 -1  1  3  3 -1  1 -1  3 |
| 11 |  1  3  3 -3 -3  1  3  1 -1 -3 -3 -3  3  3 -3  3  3 -1 -3  3 -1  1 -3  1 |
| 12 |  1  3  3  1  1  1 -1 -1  1 -3  3 -1  1 -3  3  3 -1 -3  3 -3 -1 -3 -1 -1 |
| 13 |  3 -1 -1 -1 -1 -3 -1  3  3  1 -1  1  3  3  3 -1  1  1 -3  1  3 -1 -3  3 |
| 14 | -3 -3  3  1  3  1 -3  3  1  3  1  1  3  3 -1 -1 -3  1 -3 -1  3  1  1  3 |
| 15 | -1 -1  1 -3  1  3 -3  1 -1 -3 -1  3  1  3  1 -1 -3 -3 -1 -1 -3 -3 -3 -1 |
| 16 | -1 -3  3 -1 -1 -1 -1  1  1 -3  3  1  3  3  1 -1  1 -3  1 -3  1  1 -3 -1 |
| 17 |  1  3 -1  3  3 -1 -3  1 -1 -3  3  3  3 -1  1  1  3 -1 -3 -1  3 -1 -1 -1 |
| 18 |  1  1  1  1  1 -1  3 -1 -3  1  1  3 -3  1 -3 -1  1  1 -3 -3  3  1  1 -3 |
| 19 |  1  3  3  1 -1 -3  3 -1  3  3  3 -3  1 -1  1 -1 -3 -1  1  3 -1  3 -3 -3 |
| 20 | -1 -3  3 -3 -3 -3 -1 -1 -3 -1 -3  3  1  3 -3 -1  3 -1  1 -1  3 -3  1 -1 |
| 21 | -3 -3  1  1 -1  1 -1  1 -1  3  1 -3 -1  1 -1  1 -1 -1  3  3 -3 -1  1 -3 |
| 22 | -3 -1 -3  3  1 -1 -3 -1 -3 -3  3 -3  3 -3 -1  1  3  1 -3  1  3  3 -1 -3 |
| 23 | -1 -1 -1 -1  3  3  3  1  3  3 -3  1  3 -1  3 -1  3  3 -3  3  1 -1  3  3 |
| 24 |  1 -1  3  3 -1 -3  3 -3 -1 -1  3 -1  3 -1 -1  1  1  1  1 -1 -1 -3 -1  3 |
| 25 |  1 -1  1 -1  3 -1  3  1  1 -1 -1 -3  1  1 -3  1  3 -3  1  1 -3 -3 -1 -1 |
| 26 | -3 -1  1  3  1  1 -3 -1 -1 -3  3 -3  3  1 -3  3 -3  1 -1  1 -3  1  1  1 |
| 27 | -1 -3  3  3  1  1  3 -1 -3 -1 -1 -1  3  1 -3 -3 -1  3 -3 -1 -3 -1 -3 -1 |
| 28 | -1 -3 -1 -1  1 -3 -1 -1  1 -1 -3  1  1 -3  1 -3 -3  3  1  1 -1  3 -1 -1 |
| 29 |  1  1 -1 -1 -3 -1  3 -1  3 -1  1  3  1 -1  3  1  3 -3 -3  1 -1 -1  1  3 |

3) Group hopping

The sequence-group number u within a slot n_s is defined by the group hopping pattern $f_{gh}(n_s)$ and the sequence-shift pattern $f_{ss}$ as expressed by Equation 18 below.

$$u=(f_{gh}(n_s)+f_{ss}) \bmod 30 \quad \text{[Equation 18]}$$

There exist 17 types of hopping patterns and 30 types of sequence-shift patterns. Sequence-group hopping may be enabled or disabled by the cell-specific parameter 'Group-hopping-enabled' provided by an upper layer. If PUSCH transmission is part of a random access response grant or contention-based random access procedure but does not correspond to retransmission of the same transport block, sequence-group hopping for the PUSCH may be disabled for a specific UE through an upper layer parameter 'Disable-sequence-group-hopping' even if the sequence-group hopping for the PUSCH may be enabled on a cell basis.

The group-hopping pattern, $f_{gh}(n_s)$, may be different for PUSCH, PUCCH, and SRS respectively, which is defined by Equation 19 below.

$$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled} \end{cases} \quad \text{[Equation 19]}$$

Here, c(i) is pseudo-random sequence and a cell-specific value. A pseudo-random sequence generator is initialized to $$c_{init} = \left\lfloor \frac{n_{ID}^{RS}}{30} \right\rfloor$$

at the start of each radio frame, where $n_{ID}^{RS}$ is determined according as described in '5) Determining virtual cell identity for sequence generation' below.

The sequence-shift pattern $f_{ss}$ is defined differently for PUCCH, PUSCH, and SRS.

In the case of a PUCCH, the sequence-shift pattern $f_{ss}^{PUCCH}$ is determined as $f_{ss}^{PUCCH}=n_{ID}^{RS} \bmod 30$, where $n_{ID}^{RS}$ is determined according as described in '5) Determining virtual cell identity for sequence generation' below.

In the case of a PUSCH, if the value of $n_{ID}^{PUSCH}$ is not provided by an upper layer or PUSCH transmission is part of a random access response grant or contention-based random access procedure but does not correspond to retransmission of the same transport block, the sequence-shift pattern, $f_{ss}^{PUSCH}$, is determined as $f_{ss}^{PUSCH}=(N_{ID}^{cell}+\Delta_{ss})$ mod 30, and $\Delta_{ss} \in \{0, 1, \ldots, 29\}$ is determined by an upper layer. Otherwise, the sequence-shift pattern, $f_{ss}^{PUSCH}$, is determined as $f_{ss}^{PUSCH}=n_{ID}^{RS} \bmod 30$, where $n_{ID}^{RS}$ is determined according as described in '5) Determining virtual cell identity for sequence generation' below.

In the case of an SRS, the sequence-shift pattern, $f_{ss}^{SRS}$, is determined as $f_{ss}^{SRS}=n_{ID}^{RS} \bmod 30$, where $n_{ID}^{RS}$ is determined according as described in '5) Determining virtual cell identity for sequence generation' below.

4) Sequence hopping

Sequence hopping is applied only when the length of a reference signal is $M_{sc}^{RS} \geq 6N_{sc}^{RB}$.

When the length of the reference signal is $M_{sc}^{RS} < 6N_{sc}^{RB}$, the base sequence number v within a base sequence group is 0.

When the length of the reference signal is $M_{sc}^{RS} \geq 6N_{sc}^{RB}$, the base sequence number v within the base sequence group in the slot n_s is defined by Equation 20 below.

$$v = \begin{cases} c(n_s) & \text{if group hopping is disabled and sequence hopping is enabled} \\ 0 & \text{otherwise} \end{cases} \quad \text{[Equation 20]}$$

Here, c(i) is a pseudo-random sequence and contains cell-specific values. The 'parameter Sequence-hopping-enabled' provided by the upper layer determines whether to enable sequence hopping. If PUSCH transmission is part of the random access response grant or contention-based random access procedure but does not correspond to retransmission of the same transport block, the sequence hopping for PUSCH may be disabled for a specific UE through the upper layer parameter 'Disable-sequence-group-hopping' even though the sequence hopping for PUSCH is enabled on a cell basis.

In the case of a PUSCH, the pseudo-random sequence generator is initialized to $$c_{init} = \left\lfloor \frac{n_{ID}^{RS}}{30} \right\rfloor \cdot 2^5 + f_{ss}^{PUSCH}$$

at the start of each radio frame, where $n_{ID}^{RS}$ is determined according as described in '5) Determining virtual cell identity for sequence generation' below.

In the case of an SRS, the pseudo-random sequence generator is initialized to $$c_{init} = \left\lfloor \frac{n_{ID}^{RS}}{30} \right\rfloor \cdot 2^5 + (n_{ID}^{RS} + \Delta_{ss}) \bmod 30$$

at the start of each radio frame, where $n_{ID}^{RS}$ is determined according as described in '5) Determining virtual cell identity for sequence generation' below, and $\Delta_{ss}$ is determined according as '3) Group hopping' described above.

5) Determining virtual cell identity for sequence generation

The definition of $n_{ID}^{RS}$ is dependent on the type of transmission.

Transmission related to a PUSCH:

If the $n_{ID}^{PUSCH}$ value is not set by an upper layer or if PUSCH transmission is part of random access response grant or contention-based random access procedure and corresponds to retransmission of the same transport block, $n_{ID}^{RS}=N_{ID}^{cell}$;

Otherwise, $n_{ID}^{RS}=n_{ID}^{PUSCH}$

Transmission related to PUCCH:

If the $n_{ID}^{PUCCH}$ value is not set by an upper layer, $n_{ID}^{RS}=N_{ID}^{cell}$;

Otherwise, $n_{ID}^{RS}=n_{ID}^{PUCCH}$.

SRS:

$n_{ID}^{RS}=n_{ID}^{cell}$.

6) Demodulation Reference Signal (DMRS)

A PUSCH DMRS sequence $r_{PUSCH}^{(\lambda)}(\cdot)$ related to the layer index, $\lambda \in \{0, 1, \ldots, \upsilon-1\}$, is defined by Equation 21 below.

$$r_{PUSCH}^{(\lambda)}(m \cdot M_{sc}^{RS}+n)=w^{(\lambda)}(m)r_{u,v}^{(\alpha_\lambda)}(n) \quad \text{[Equation 21]}$$

m=0,1
n=0, . . . , $M_{sc}^{RS}$−1
$M_{sc}^{RS}=M_{sc}^{PUSCH}$

Here, $M_{sc}^{PUSCH}$ denotes bandwidth scheduled for uplink transmission, which is expressed by the number of subcarriers.

As described above, $r_{u,v}^{(\alpha_\lambda)}(0), \ldots, r_{u,v}^{(\alpha_\lambda)}(M_{sc}^{RS}-1)$ denotes a reference signal sequence obtained from a base sequence $\bar{r}_{u,v}(n)$ by applying a cyclic shift value, $\alpha_\lambda$.

An orthogonal sequence $w^{(\lambda)}(m)$ is set for the DCI format 0 so that $[w^\lambda(0)\ w^\lambda(1)]=[1\ 1]$ when the upper layer parameter 'Activate-DMRS-with OCC' is not set or when temporary C-RNTI is used to transmit the most recent uplink-related DCI with respect to the corresponding PUSCH transmission.

Otherwise, the orthogonal sequence may be set as shown in Table 9 below according to the 'cyclic shift field' included in the most recent uplink related DCI with respect to the transport block related to the corresponding PUSCH transmission.

In the $[w^{(\lambda)}(0)\ w^{(\lambda)}(1)]$, $w^{(\lambda)}(0)$ is a value applied to a first slot of the layer index $\lambda$, and $w^{(\lambda)}(1)$ is a value applied to a second slot of the layer index $\lambda$.

In the slot number $n_s$, the cyclic shift value, $\alpha_\lambda$, is defined by Equation 22 below.

$$\alpha_\lambda = 2\pi n_{cs,\lambda}/12 \quad \text{[Equation 22]}$$

Here, $n_{cs,\lambda}$ may be defined by Equation 20 below.

$$n_{cs,\lambda}=(n_{DMRS}^{(1)}+n_{DMRS,\lambda}^{(2)}+n_{PC}(n_s)) \bmod 12 \quad \text{[Equation 23]}$$

In Equation 23, the $n_{DMRS}^{(1)}$ value is indicated by an upper layer parameter 'cyclicShift'. The upper layer parameter 'cyclicShift'

Table 8 shows a correspondence relationship between the 'cyclicShift' parameter and $n_{DMRS}^{(1)}$.

TABLE 8

| cyclicShift | $n_{DMRS}^{(1)}$ |
|---|---|
| 0 | 0 |
| 1 | 2 |
| 2 | 3 |
| 3 | 4 |
| 4 | 6 |
| 5 | 8 |
| 6 | 9 |
| 7 | 10 |

In Equation 23, $n_{DMRS,\lambda}^{(2)}$ is set by 3 bits of cyclic shift for the DMRS field delivered within the most recent uplink-related DCI with respect to the transport block related to the corresponding PUSCH transmission, and the $n_{DMRS,\lambda}^{(2)}$ value is shown in Table 9.

Table 9 shows a correspondence relationship between the cyclic shift field within uplink-related DCI, $n_{DMRS,\lambda}^{(2)}$, and $[w^{(\lambda)}(0)\ w^{(\lambda)}(1)]$.

TABLE 9

| Cyclic Shift Field in uplink-related DCI format | $n_{DMRS,\lambda}^{(2)}$ | | | | $[w^{(\lambda)}(0)\ w^{(\lambda)}(1)]$ | | | |
|---|---|---|---|---|---|---|---|---|
| | $\lambda=0$ | $\lambda=1$ | $\lambda=2$ | $\lambda=3$ | $\lambda=0$ | $\lambda=1$ | $\lambda=2$ | $\lambda=3$ |
| 000 | 0 | 6 | 3 | 9 | [1 1] | [1 1] | [1 −1] | [1 −1] |
| 001 | 6 | 0 | 9 | 3 | [1 −1] | [1 −1] | [1 1] | [1 1] |
| 010 | 3 | 9 | 6 | 0 | [1 −1] | [1 −1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 −1] | [1 −1] | [1 −1] | [1 −1] |
| 110 | 10 | 4 | 1 | 7 | [1 −1] | [1 −1] | [1 −1] | [1 −1] |
| 111 | 9 | 3 | 0 | 6 | [1 1] | [1 1] | [1 −1] | [1 −1] |

If uplink-related DCI with respect to the same transport block related to the corresponding PUSCH transmission does not exist and corresponds to either) of the following cases, the first column of Table 9 may be used for the $n_{DMRS,0}^{(2)}$ and $w^{(\lambda)}(m)$ value:

A case where the initial PUSCH for the same transport block is scheduled semi-persistently or A case where the initial PUSCH for the same transport block is scheduled by a random access response grant.

The $n_{PN}(n_s)$ value in Equation 23 may be defined by Equation 24 below.

$$n_{PN}(n_s)=\Sigma_{i=0}^{7}c(8N_{symb}^{UL}\cdot n_s+i)\cdot 2^i \quad \text{[Equation 24]}$$

Here, c(i) is a pseudo-random sequence and a cell-specific value. A pseudo-random sequence generator is initialized to $c_{init}$ at the start of a radio frame. If the value of $N_{ID}^{csh\_DMRS}$ is not set by the upper layer or if PUSCH transmission is part of the random access response grant or contention-based random access procedure and corresponds to retransmission of the same transport block, $c_{init}$ is determined as $$c_{init}=\left\lfloor\frac{N_{ID}^{cell}}{30}\right\rfloor\cdot 2^5+((N_{ID}^{cell}+\Delta_{ss})\bmod 30).$$

Otherwise, $c_{init}$ is determined as $$c_{init}=\left\lfloor\frac{N_{ID}^{csh\_DMRS}}{30}\right\rfloor\cdot 2^5+(N_{ID}^{csh-DMRS}\bmod 30).$$

A vector of a reference signal is precoded as expressed by Equation 25 below.

$$\begin{bmatrix}\tilde{r}_{PUSCH}^{(0)}\\ \vdots \\ \tilde{r}_{PUSCH}^{(P-1)}\end{bmatrix}=W\begin{bmatrix}r_{PUSCH}^{(0)}\\ \vdots \\ r_{PUSCH}^{(\upsilon-1)}\end{bmatrix} \quad \text{[Equation 25]}$$

Here, P represents the number of antenna ports used for PUSCH transmission.

In the case of PUSCH transmission using a single antenna port, P=1, W=1, and $\upsilon=1$.

In the case of spatial multiplexing, P=2 or P=4, and the precoding matrix W is the same as the precoding matrix used for precoding of the PUSCH within the same subframe.

In the case of an antenna port used for PUSCH transmission, the sequence $\tilde{r}_{PUSCH}^{(\tilde{p})}(\cdot)$ is multiplied by an amplitude scaling factor $\beta_{PUSCH}$ and mapped to a resource block in the order starting from $r_{PUSCH}^{(\tilde{p})}(0)$. A set of physical resource blocks used for the mapping process and the relationship between the index $\tilde{P}$ and the number of antenna ports p is the same as in the corresponding PUSCH transmission.

Mapping to the resource element (k,l) (namely, a resource element having a frequency-domain index k and time-domain index l) within a subframe (in the case of normal cyclic prefix, l=3 while, in the case of extended cyclic prefix, l=2) is performed in the order of increasing k and then in the order of increasing slot number.

Table 10 shows upper layer (for example, an RRC layer) parameters in a wireless communication system to which the present invention may be applied.

TABLE 10

| Parameter | Description | Value range |
| --- | --- | --- |
| CSI-Reporting-Type | Each CSI process may be configured as class A or B | 1 bit indicative of Class A or class B |
| Codebook-Config-N1 | Antenna port number per polarization in first dim of codebook of Rel. 13 | ENUMERATED {an1, an2, an3, an4, an8} |
| Codebook-Config-N2 | An antenna port number per polarization in second dim of codebook of Rel. 13 | ENUMERATED {an1, an2, an3, an4, an8} |
| PMI-Config | Each UE may receive one of W-only PMI feedback and legacy PMI feedback configured thereto | The enumeration of {1, 2} for indicating the selection of PMI feedback |
| Codebook-Over-Sampling-RateConfig-O1 | A codebook spatial oversampling rate of first dimension of Rel. 13 codebook | {N/A, 4, 8} |
| Codebook-Over-Sampling-RateConfig-O2 | A codebook spatial oversampling rate of second dimension of Rel. 13 codebook | {N/A, 4, 8} |
| Codebook-Subset-SelectionConfig | A subset of a master codebook entry is configured in each UE | The enumeration of {1, 2, 3, 4} indicates codebook configurations |
| R13-Codebook-Subset-Restriction-1 | 2D beams indicate that reporting will not be permitted | With respect to W1 CSR, A bitmap of (N1*O1*N2*O2) bits indicates a 2D beam subset restriction. Furthermore, an additional 8-bit bitmap for a rank restriction |
| R13-Codebook-Subset-Restriction-2 | i2 indicates that reporting will not be permitted | Specified in TS 36.213 |
| NZP-CSI-RS-R13 | A group of NZP-CSI-RS parameters indicates that it will be used for Class A CSI reporting (based on legacy CSI-RS resources) | A maximum number of R13 NZP CSI-RS per CC is 3 |
| NZP-CSI-RS-ID-List | Indicate a set of legacy CSI-RS-ConfigNZPId-r11 associated with this CSI Process | A maximum size of a list is 8 Each ID is integer {1, . . . , 24} |
| CSI-IM-ID-List | Indicate csi-IM-ConfigId-r11 associated with this CSI process. | The size of a set is the same as NZP-CSI-RS-ID-List |

TABLE 10-continued

| Parameter | Description | Value range |
|---|---|---|
| | Each CSI-IM-ConfigId is associated with one CSI-RS-ConfigNZPId | having a one-to-one connection between NZP-CSI-RS-ID-List and CSI-IM-List. Each ID is integer {1, . . . , 24} |
| legacyCSRList | A list of legacy codebook subset restriction bitmaps, each CSI-IM-ConfigId is associated with one CSI-RS-ConfigNZPId | The size of a list is the same as NZP-CSI-RS-ID-List having a one-to-one connection between NZP-CSI-RS-ID-List and legacy CSR list |
| Channel-Measurement-Restriction | A measurement restriction for channel measurement indicates whether it is activated or deactivated | 1 bit for indicating whether a measurement restriction for channel measurement is activated or deactivated |
| Interference-Measurement-Restriction | Indicate whether a measurement restriction for interference measurement is activated or deactivated | 1 bit for indicating whether a measurement restriction for interference measurement is activated or deactivated |
| CRI-Config-Index | Indicate a subframe offset of a CSI-RS resource indicator for selecting a period (as an integer multiple of an RI period) and NZP-CSI-RS resource | Integer (0 . . . 1023), |
| CDM-type | Indicate CDM2 or CDM4 type of R13 NZP-CSI-RS | 1 bit for indicating CDM2 or CDM 4 |
| NZP-CSI-RS-Configuration-List | Indicate a set of CSI-RS-configurations for producing R13 NZP-CSI-RS | The size of a list may be a [2, 3, 6, 8] value from each configuration = [1 . . . 32]. A value range is different if a bitmap is used to indicate a list. |
| Number-of-antenna-ports-per-CSI-RS-Configuration | An antenna port number for all NZP-CSI-RS configurations of Configuration-List | ENUMERATED {an2, an4, an8} |
| Subframe-config | A subframe configuration for all NZP-CSI-RS configurations of Configuration-List | Integer (0 . . . 154), |
| Scrambling ID | A scrambling ID for all NZP-CSI-RS configurations of Configuration-List | Integer (0 . . . 503), |
| QCL info | QCL information for all NZP-CSI-RS configurations of Configuration-List | Same as legacy |
| Number-of-additional-Uppts | Indicate an additional UpPTS symbol number | ENUMERATED {2 symbol, 4 symbol} |
| PcList | Indicate the power offset of an NZP CSI-RS RE for a PDSCH RE. Each Pc in a list is associated with NZP CSI-RS configured in NZP CSI-RS-ID-List | Same as previous one |
| Rel-13-DMRS-table | Indicate that a UE should use a new DMRS table in DCI. | 1 bit indicating that a new or legacy table of Rel-13 should be used |
| SoundingRS-UL-ConfigDedicated-extendedUpPTs | An SRS configuration parameter for an extended UpPTS in a trigger type 0 | The same parameter set and value ranges are used as in SoundingRS-UL-ConfigDedicated. In this case, the modification of value ranges of a new parameter (Number-of-combs) and parameters (transmissionComb, cyclicShift) is excluded. |
| SoundingRS-UL-ConfigDedicatedAperiodic-extendedUpPTS | An SRS configuration parameter for an extended UpPTS for a trigger type 1 | The same parameter set and value ranges are used as in SoundingRS-UL-ConfigDedicatedAperiodic-r10. In this case, the modification of value ranges of a new parameter (Number-of-combs) and parameters (transmissionCombAp, cyclicShiftAp) is excluded. |
| Number-of-combs | Indicate the number of Combs | ENUMERATED {2 combs, 4 combs} |
| transmissionComb | Indicate a parameter k_TC∈{0, 1, 2, 3} for periodic sounding reference signal transmission | Integer (0 . . . 3) |
| transmissionCombAp | Indicate a parameter k_TC∈{0, 1, 2, 3} for aperiodic sounding reference signal transmission | Integer (0 . . . 3) |

TABLE 10-continued

| Parameter | Description | Value range |
| --- | --- | --- |
| cyclicShift | Indicate a parameter: n_SRS for each periodic sounding reference signal transmission. TS 36.211 [21, 5.5.3.1], In this case, cs0 corresponds to 0, etc. | ENUMERATED {cs0, cs1, cs2, cs3, cs4, cs5, cs6, cs7, cs8, cs9, cs10, cs11} |
| cyclicShiftAp | Indicate parameter: n_SRS for each aperiodic sounding reference signal transmission | ENUMERATED {cs0, cs1, cs2, cs3, cs4, cs5, cs6, cs7, cs8, cs9, cs10, cs11} |

Uplink DMRS Design for Efficient Multiple-User (MU) MIMO Pairing

In what follows, the term for a base station in the present document is used comprehensively to include a remote radio head (RRH), transmission point (TP), reception point (RP), eNB, and relay.

In what follows, for the purpose of convenience, the present invention is described with respect to the 3GPP LTE system. However, the technical scope of the wireless communication system to which the present invention is applied may be expanded to other systems including the 3GPP LTE system.

Currently, about DMRS configuration at the time of uplink PUSCH transmission performed by a UE, a method based on orthogonality of cyclic shift and a method based on the orthogonal cover code (OCC) are mainly used for effective support of the UL MU-MIMO scheme.

In the former case, a DMRS sequence is generated from the same base sequence among UL MU-paired UEs; however, since a different cyclic shift (CS) is set for each UE, orthogonality with respect to UL MU-MIMO paired UEs may be ensured during DMRS transmission (in other words, DMRSs may be multiplexed). To this purpose, the same UL scheduling RB(s) has to be set for the corresponding MU-paired UEs.

In the latter case, a fully overlapped RB(s) does not necessarily have to be scheduled among MU-paired UEs; although partially overlapping bandwidth(s) (BW(s)) is allocated, orthogonality may be ensured by the OCC.

According to a method based on the OCC, for each of two PUSCH DMRS symbol series (namely, in the case of normal cyclic prefix, the fourth symbol (I=3) of each slot and in the case of extended cyclic prefix, the third symbol (I=2) of each slot) defined in one subframe, [+1, +1] or [+1, −1] is applied, and thereby orthogonality with respect to UL MU-MIMO paired UEs due to the OCC length-2 may be ensured (namely DMRSs may be multiplexed).

In the present invention, to enable two or more UL MU-MIMO scheduling, a method for allocating more orthogonal PUSCH DMRSs than the existing methods is proposed.

In particular, the present invention takes into account a case in which an eNB is equipped with a plurality of antennas, such as a massive MIMO (which may be alternatively called Full Dimension (FD)-MIMO, enhanced-MIMO, large scale antenna system, very large MIMO, or hyper-MIMO) environment.

Also, the present invention proposes a method for allocating orthogonal PUSCH DMRSs to enable two or more UL MU-MIMO scheduling while allocating a fully-overlapped RB(s) or partially overlapping BW(s).

1. Time domain OCC extension (for example, multi-subframe (SF) form)

A. According to the present embodiment, by additionally allocating a symbol to which a PUSCH DMRS is mapped to the time domain, time-domain OCC length-T (here, T>2, for example, T=4) may be applied.

B. As one example, when an eNB transmits a specific uplink grant to a UL-MIMO paired UE, to achieve the object above, the eNB may indicate so that the uplink grant is scheduled in the form of bundling among S (adjacent) subframes over the band in which an RB(s) is scheduled always in the same manner. For example, when S=2, by applying an OCC length-4 (for example, one OCC from [+1, +1, +1, +1], [+1, −1, +1, −1], [+1, +1, −1, −1], or [+1, −1, −1, +1]) to a total of 4 PUSCH DMRS symbols defined throughout the subframes where S=2, the eNB may indicate or configure so that the UE transmits a PUSCH DMRS.

Figure 14:
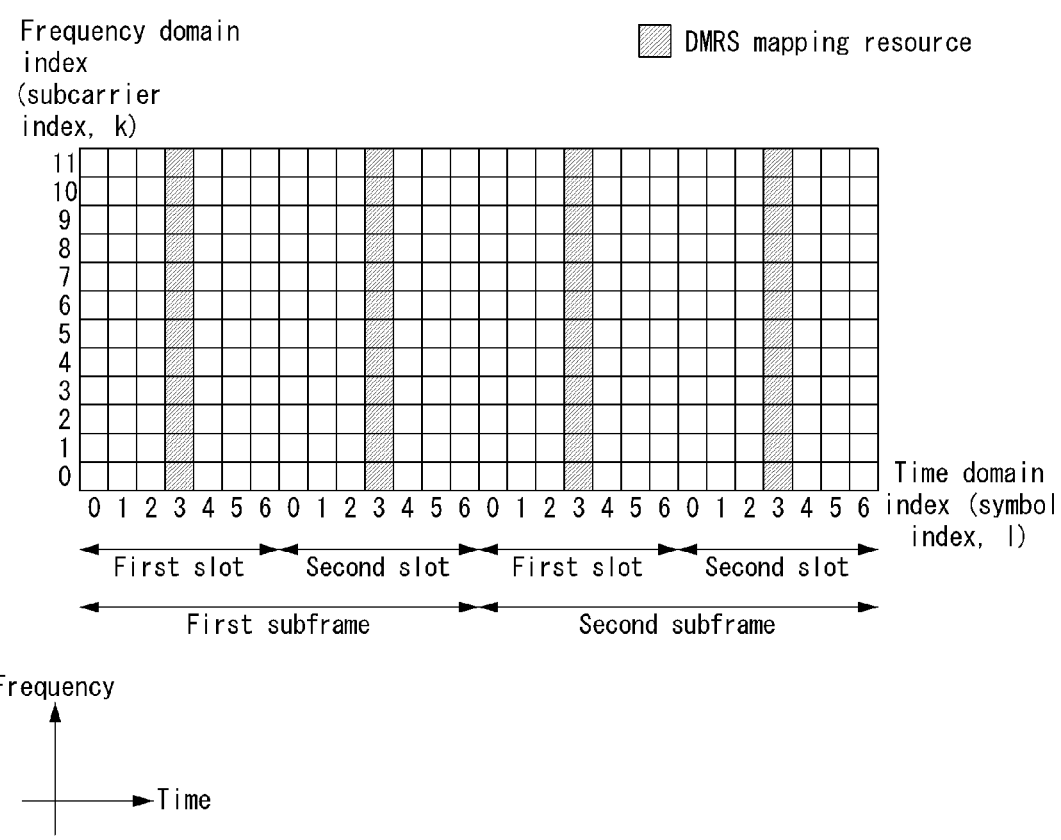
FIG. 14 illustrates an uplink PUSCH DMRS mapping method according to one embodiment of the present invention.

FIG. 14 illustrates an uplink PUSCH DMRS mapping method according to one embodiment of the present invention.

FIG. 14 illustrates a case in which normal cyclic prefix is applied.

For the convenience of descriptions, FIG. 14 illustrates a case in which one RB (namely 12 subcarriers) in the frequency domain and PUSCH resources of two subframes in the time domain are allocated to a UL MU-MIMO paired UE but the present invention is not limited to the specific case.

Referring to FIG. 14, a UE may map a DMRS sequence to 4 symbols (namely the third symbol of the first slot of the first subframe, third symbol of the second slot of the first subframe, third symbol of the first slot of the second subframe, and third symbol of the second slot of the second subframe) within an allocated PUSCH resource region.

And the OCC length-4 may be applied to a total of 4 PUSCH DMRS symbols. For example, if [+1, −1, +1, −1] is applied, +1 is multiplied to the DMRS sequence mapped to the third symbol of the first slot of the first subframe, −1 is multiplied to the DMRS sequence mapped to the third symbol of the second slot of the first subframe, +1 is multiplied to the DMRS sequence mapped to the third symbol of the first slot of the second subframe, and −1 is multiplied to the DMRS sequence mapped to the third symbol of the second slot of the second subframe.

Alternatively, differently from the example of FIG. 14, in addition to the symbol (namely, in the case of normal cyclic prefix, the fourth symbol of each slot (I=3) and in the case of extended cyclic prefix, the third symbol of each slot (I=2)) to which an existing PUSCH DMRS is mapped within a single subframe (SF), by allocating an additional PUSCH DMRS symbol (for example, by allocating one DMRS symbol additionally for each symbol), it may be indicated or set so that the OCC length-T (where T>2) may be applied.

C. Specific UL-related DCI which carries the aforementioned UL grant (namely scheduling in the form of bundling among S (adjacent) subframes) may have a single resource allocation (RA) field. However, suppose the DCI has been transmitted from SF #n. Then the UE may recognize that a multi-SF scheduling grant is transmitted, and thereby the corresponding scheduled PUSCH transmission is performed not only at the conventional SF #n+k (for example, k=4) time point but also at the next SF #n+k+1 time point.

If the UE receives DCI carrying a UL grant and at least one condition is met among the following methods, the UE may regard the corresponding UL grant as resource allocation in the form of bundling among S (adjacent) subframes (or part of the following conditions may be combined).

i) Indication Method Using Upper Layer Signaling

Through specific upper layer signaling (for example, RRC signaling or MAC control element (CE)), activation (and/or deactivation) of the aforementioned operation (namely resource allocation in the form of bundling among S (adjacent) subframes by a single RA field) may be configured in a semi-static manner.

Or by being implicitly linked to an existing RRC-configured feature(s) such as transmission mode configuration, activation (and/or deactivation) of the aforementioned operation may be configured. In one example, if specific TM is configured for the corresponding UE, the UE may recognize to implicitly activate the operation.

ii) Method Using Explicit DCI Indication

Either in the form of defining an additional bit field or reusing an existing field for a specific DCI format, activation of the aforementioned operation (namely resource allocation in the form of bundling among S (adjacent) subframes due to a single RA field) may be explicitly indicated.

And/or separate RNTI may be defined for indicating the aforementioned different PUSCH scheduling (namely resource allocation in the form of bundling among S (adjacent) subframes due to a single RA field). When DCI scheduled according to the RNTI (DCI masked by the corresponding RNTI) is detected, the UE may be made to perform the PUSCH transmission described above.

iii) Method Using Implicit Indication

When the eNB provides a subframe set-related configuration to the UE in advance, and the corresponding UL-related DCI is received within a specific subframe(s), the aforementioned operation (namely resource allocation in the form of bundling among S (adjacent) subframes due to a single RA field) may be performed.

Alternatively, if a specific condition is satisfied such that a scheduling grant is delivered in a specific DCI format (for example, DCI format 0 or 4), a scheduling grant is delivered only to specific search space (for example, only to UE-specific search space (USS) or only to common search space (CSS)), or a scheduling grant is delivered to a specific control channel type (for example, enhanced PDCCH (EPDCCH)) or to a specific set (set 0 or set 1) of the EPDCCH, the aforementioned operation (namely resource allocation in the form of bundling among S (adjacent) subframes due to a single RA field) may be performed. The specific conditions above may be predefined or configured through upper layer signaling (for example, RRC signaling).

2. Frequency Domain Extension (for Example, Comb Form)

A. According to the conventional method, when a PUSCH DMRS sequence is mapped, a PUSCH DMRS sequence element is mapped for each subcarrier (or for each RE) in a specific scheduled RB(s) region within one SC-FDMA symbol.

On the other hand, according to the present embodiment, a PUSCH DMRS sequence may be mapped for each $D\_k$ subcarrier (or for each RE) (for example, $D\_k=2$) within a symbol to which the PUSCH DMRS sequence is mapped. In other words, the PUSCH DMRS sequence may be mapped with as much spacing as the $D\_k$ subcarriers (or REs) within a symbol to which the PUSCH DMRS sequence is mapped. At this time, the PUSCH DMRS sequence may be mapped within an RB(s) region in which the PUSCH DMRS sequence has been scheduled.

At this time, the $D\_k$ value may be set to 1, 2, 3, 4, and so on. For example, the $D\_k$ value may be provided by upper layer signaling (for example, RRC signaling or MAC CE) or predefined to have a fixed value. Here, the case where $D\_k=1$ corresponds to the case of not using the comb form as in the existing methods.

Also, the $D\_k$ value which may be configured in a more specific manner may be limited to the power of 2, such as 1, 2, 4, and the like. In addition, the case where $D\_k=3$ may be allowed (which takes into account the fact that one RB is composed of 12 subcarriers).

As one example, the eNB may inform the corresponding UE of whether the DMRS sequence forms an "even comb" or "odd comb" for mapping of the DMRS sequence by the UE.

At this time, as described above, if $D\_k$ value of 2 is configured for the UE, the eNB may inform the corresponding UE of whether the sequence forms an "even comb" or "odd comb".

Alternatively, the $D\_k$ value is prefixed to 2, and the eNB may inform the corresponding UE of whether the sequence is an "even comb" or "odd comb".

About whether the sequence forms an "even comb" or "odd comb", the eNB may configure the comb type to be used by the corresponding UE in a semi-static manner through upper layer signaling (for example, RRC signaling).

Alternatively, about whether the sequence forms an "even comb" or "odd comb", the eNB may indicate the comb type dynamically through DCI (when a DMRS sequence mapping operation is indicated in the form of comb by DCI). For example, a new DCI field of 1 bit may be defined, and whether the sequence is an "even comb" or "odd comb" may be indicated through the corresponding field. Besides, through at least one method among various forms of indicating methods described in 1.0 (namely at least one of the indication method using upper layer signaling, method using explicit DCI indication, and method using implicit indication), whether the sequence forms an "even comb" or "odd comb" may be indicated.

In the present document, indicating whether the sequence forms an even comb or odd comb is equal to indicating an RE within a mapping symbol of a DMRS sequence (in other words, in the case of normal cyclic prefix, a symbol with a symbol index 3 and in the case of extended cyclic prefix, a symbol with a symbol index 2), to which the DMRS sequence is mapped.

However, the present invention is not limited to indicating whether a sequence is an even comb or odd comb. In the present document, the description may be called simply "comb" or the description may also be referred to as comb form, comb resource, comb configuration method, comb-related configuration, comb type, or comb type configuration. Furthermore, the description may also be referred to as Interlaced/Interleaved Frequency Division Multiple Access (IFDMA) configuration, an indicator for determining a mapping resource (namely subcarrier or RE) of a DMRS sequence, and so on.

i) When "even comb" is configured/indicated, the UE may perform PUSCH DMRS sequence mapping starting from the first RB index within the corresponding, scheduled RB(s) region (namely indicated by the RA field of DCI). In other words, the UE may map the PUSCH DMRS sequence to the REs within the third symbol of the first slot and the third symbol of the second slot from the first RB index to the last RB index within the corresponding, scheduled RB(s) region.

At this time, in the case of "even comb", the PUSCH DMRS sequence may be mapped only to the REs in the ascending order of even-numbered subcarrier index, such as {0, 2, 4, 6, 8, 10} out of the 12 subcarrier indices (0, 1, 2, 3, . . . , 11) within the third symbol of the first slot and the third symbol of the second slot within the corresponding, initial RB indices. And subsequently for the next RB index, the PUSCH DMRS sequence may be mapped only to the REs having an even-numbered subcarrier index within the third symbol of the first slot and the third symbol of the second slot.

ii) When "odd comb" is configured/indicated, the UE may perform PUSCH DMRS sequence mapping starting from the first RB index within the corresponding, scheduled RB(s) region (namely indicated by the RA field of DCI). In other words, the UE may map the PUSCH DMRS sequence to the REs within the third symbol of the first slot and the third symbol of the second slot from the first RB index to the last RB index within the corresponding, scheduled RB(s) region.

At this time, in the case of "odd comb", the PUSCH DMRS sequence may be mapped only to the REs in the ascending order of odd-numbered subcarrier index, such as {1, 3, 5, 7, 9, 11} out of the 12 subcarrier indices (0, 1, 2, 3, . . . , 11) within the third symbol of the first slot and the third symbol of the second slot within the corresponding, initial RB indices. And subsequently for the next RB index, the PUSCH DMRS sequence may be mapped only to the REs having an odd-numbered subcarrier index within the third symbol of the first slot and the third symbol of the second slot.

Figure 15:
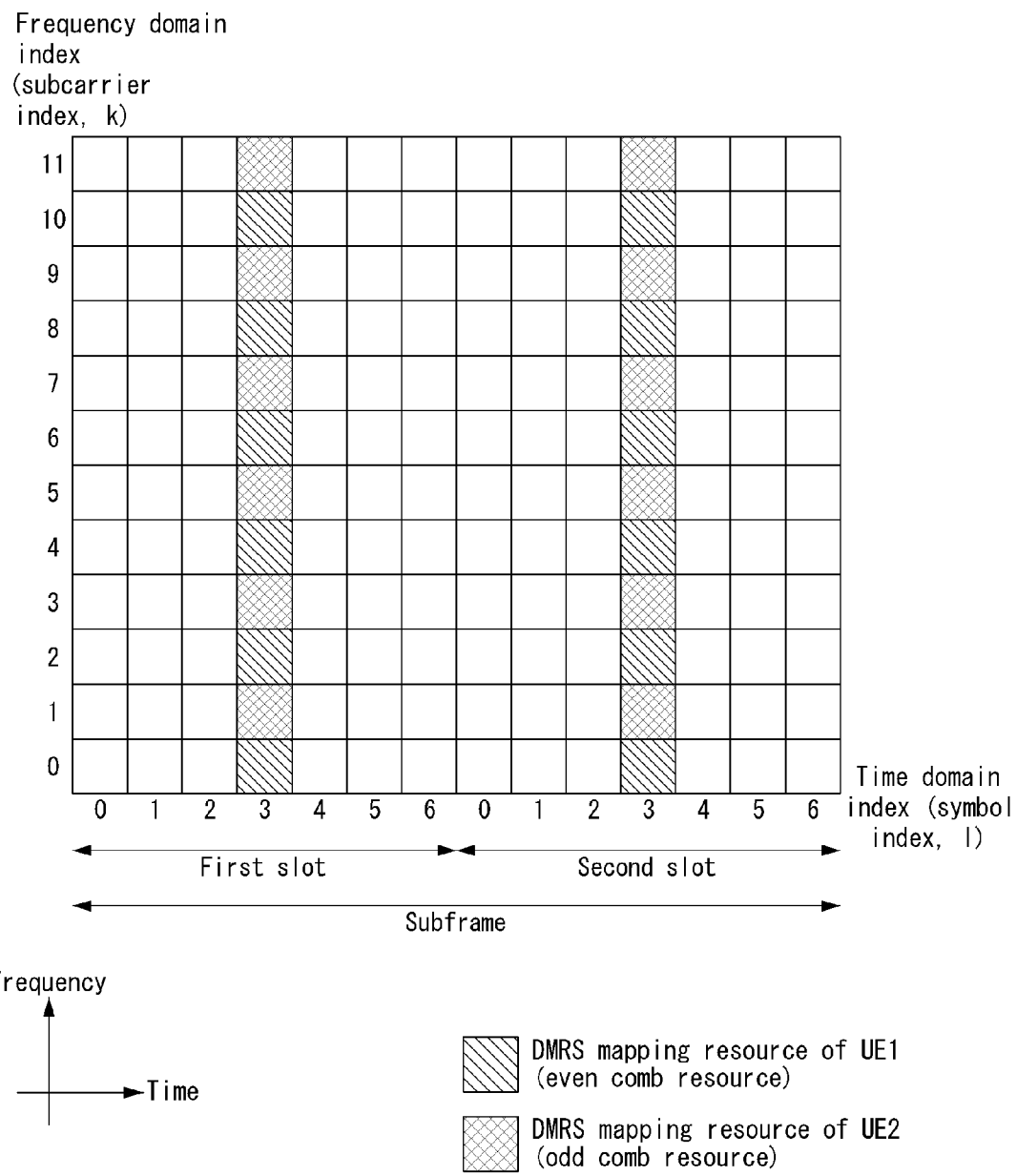
FIG. 15 illustrates an uplink PUSCH DMRS mapping method according to one embodiment of the present invention.

FIG. 15 illustrates an uplink PUSCH DMRS mapping method according to one embodiment of the present invention.

FIG. 15 illustrates a case in which normal cyclic prefix is applied.

For the convenience of descriptions, FIG. 15 illustrates a case in which one RB (namely 12 subcarriers) in the frequency domain and PUSCH resources of one subframe in the time domain are allocated to a UL MU-MIMO paired UE but the present invention is not limited to the specific case.

Also, for the convenience of descriptions, FIG. 15 assumes that $D\_k$ value is 2, DMRS mapping resources of UE 1 correspond to even comb resources, and DMRS mapping resources of UE 2 correspond to odd comb resources.

Also, FIG. 15 assumes that a DMRS is mapped to the same symbol as existing one in the time domain.

Referring to FIG. 15, UE 1 and UE 2 may map a DMRS sequence to two symbols (namely, in the case of normal cyclic prefix, the third symbol of the first slot and the third symbol of the second slot) within the allocated PUSCH resource region in the form of combs.

UE 1 may map a DMRS sequence to an RE having an even numbered subcarrier index (namely {0, 2, 4, 6, 8, 10}) within the third symbol of the first slot and the third symbol of the second slot.

On the other hand, UE 2 may map a DMRS sequence to an RE having an odd numbered subcarrier index (namely {1, 3, 5, 7, 9, 11}) within the third symbol of the first slot and the third symbol of the second slot.

And UE 1 and UE 2 may apply the OCC length-2 to a total of two PUSCH DMRS symbols, respectively.

For example, if UE 1 applies [1, −1], +1 may applied to the DMRS sequence mapped to the third symbol of the first slot, and −1 may be multiplied to the DMRS sequence mapped to the third symbol of the second slot.

Also, if UE 2 applies [−1, 1], −1 is applied to the DMRS sequence mapped to the third symbol of the first slot, and +1 may be multiplied to the DMRS sequence mapped to the third symbol of the second slot.

iii) The even/odd comb in the descriptions given above is an example when $D\_k=2$. Meanwhile, if $D\_k>2$, for example, a UE may be indicated/configured to map the corresponding PUSCH DMRS sequence only to the RE having a subcarrier index corresponding to a specifically configured/indicated value ($d\_k$), where the subcarrier index is obtained as a remainder after the UE takes a modulo of the $D\_k$ value. For example, if $D\_k=4$, the UE may be configured to have one of the four comb resources ($d\_k=0, 1, 2, \ldots, D\_k-1$). At this time, $d\_k$ value may be indicated/configured for the UE through upper layer signaling (for example, RRC signaling) or DCI.

For example, the UE indicated/configured by $d\_k=0$ may map the PUSCH DMRS sequence only to the RE having a subcarrier index of {0, 4, 8} of each RB in the ascending order of the subcarrier index. The UE indicated/configured by $d\_k=1$ may map the PUSCH DMRS sequence only to the RE having a subcarrier index of {1, 5, 9} of each RB in the ascending order of the subcarrier index. The UE indicated/configured by $d\_k=2$ may map the PUSCH DMRS sequence only to the RE having a subcarrier index of {2, 6, 10} of each RB in the ascending order of the subcarrier index. The UE indicated/configured by $d\_k=3$ may map the PUSCH DMRS sequence only to the RE having a subcarrier index of {3, 7, 11} of each RB in the ascending order of the subcarrier index.

iv) In another method, instead of dividing frequency resources for DMRS mapping into subcarrier units as described above, the UE may be configured/indicated to divide frequency resources for DMRS mapping in RB index units.

For example, within the corresponding scheduled RB(s) region (namely the region indicated by the RA field of DCI), UE 1 may map the DMRS sequence only to even-indexed RB(s) while UE 2 may map the DMRS sequence only to odd-indexed RB(s). In this manner, resource division for DMRS mapping may be applied in RB units among UL MU-MIMO paired UEs.

As described above, even when resource division for DMRS mapping is applied in RB units, if three or more UEs are UL MU-MIMO paired, each UE may map the DMRS sequence only to the RBs which coincide with a remainder obtained from a specific modulo operation in RB units.

In this manner, frequency granularity such as RE-level or RB-level may be predefined or applied according to a configuration by the eNB. Also, the present invention is not limited to the RE-level or RB-level; as for larger granularity, however, it is obvious that the present invention may be modified to include frequency resource division for DMRS mapping among UL MU-MIMO paired UEs in a specific RB-group unit (for example, 2 RB group unit).

B. The aforementioned methods are intended to obtain additional orthogonality from frequency resource division.

Therefore, without applying OCC length-T (for example, T>2) as described in the method 1 above, the OCC length-2 may still be applied to two PUSCH DMRS symbols within the corresponding scheduled subframe.

However, the present invention is not limited to the scheme above, but as described in the method 3 below, extension in the form of the OCC length-T (for example, T>2) may be applied together with comb extension (namely, a method by which UL MU-MIMO paired UEs map a PUSCH DMRS sequence to a comb form).

C. Specifically, one of the effects obtained from the method utilizing comb extension is that the legacy UE 1 is also able to receive UL MU-MIMO scheduling as follows.

For example, UE1, UE2, and UE3 may receive scheduling for UL MU-MIMO transmission as follows.

Legacy UE1 (OCC [+1, +1] is applied)
Enhanced UE2 (OCC [+1, −1] and "even comb" are applied)
Enhanced UE3 (OCC [+1, −1] and "odd comb" are applied)

If configured as described above, since resources to which a DMRS sequence is mapped are distinguished (in other words, Frequency Division Multiplexing (FDM)) between UE2 and UE3 in the frequency domain, and mutually orthogonal OCCs (namely [+1, +1] and [+1, −1]) are applied to the respective DMRs sequences between UE 1 and UE2; and UE1 and UE3, orthogonality is maintained. Accordingly, 3 UEs including a legacy UE may be co-scheduled together, and therefore, an advantage may be obtained that UL MU-MIMO pairing may be performed among the 3 UEs even if the legacy UE which does not know comb extension is included therein.

D. In addition, a method for generating a PUSCH DMRS due to comb extension and transmitting a PUSCH according thereto may be limited so that the method is applied only for the case of a specifically scheduled RB size or more.

That is, the method may be limited so that comb extension is applied only when a scheduled RB size is larger than T_RB (=2 or 3 or 4).

As one example, T_RB may be fixed or configured to 2. In this case, the reason why T_RB=2 is that if an operation based on comb extension is allowed even for the case of 1 RB scheduling, for example, the corresponding 1 RB is allocated by being divided into an even/odd comb, a PUSCH DMRS sequence mapped over 6 subcarriers (REs) has to be newly defined, and the sequence length becomes excessively shortened, which may cause performance degradation.

That is, simply by configuring/applying T_RB=2, the comb extension may be applied while the method for generating a legacy PUSCH DMRS sequence is still utilized in the same manner.

In other words, for example, setting T_RB=2 is intended to allow only specifically scheduled RBs capable of reusing a legacy DMRS sequence while comb extension is still utilized without introduction of a new DMRS sequence as described above. The setting of T_RB=2 explicitly indicates that scheduling due to the comb extension is allowed only when the number of scheduled PRBs is 2, 4, 6, and so on. In other words, if the number of scheduled PRBs is 2, 4, 6, and so on, a repetition factor (RPF) of 2 may be applied to a legacy PUSCH DMRS sequence the number of PRBs of which is 1, 2, 3, and so on; spacing among elements within the sequence is widened as much as the PRF=2 (namely by inserting a zero between sequence elements), and then the DMRS may be transmitted together with PUSCH data.

At this time, T_RB may be defined/configured to have a specific value larger than 2. Although scheduling may be constrained according as T_RB is defined/configured to have a value larger than 2, it is advantageous that performance of a method due to the comb extension is ensured in a more reliable manner.

As a result, since a specific T_RB value for which comb extension may be applied is defined/configured as described above, comb extension may not be applied for a scheduled RB size smaller than the specific value. In this case, if the scheduled RB size figured out from the RA field of DCI is smaller than T_RB, the UE may perform PUSCH transmission according to a legacy DMRS generation method to which comb extension is not applied. On the other hand, if a scheduled RB size if larger than T_RB, PUSCH transmission may be performed according to a new DMRS generation method to which comb extension is applied.

In other words, for example, if the number of PUSCH scheduled PRBs is 1, 3, 5, and so on, a legacy DMRS sequence to which RPF=1 is applied exceptionally as in the prior art may be used directly without comb extension. Meanwhile, if the number of scheduled PRBs is 2, 4, 6, and so on, a legacy sequence (the number of PRBs of which is 1, 2, 3, . . . , respectively) to which RPF=2 is applied may be applied together with comb extension to transmit a DMRS together with PUSCH data.

i) In a yet another method, for example, if the number of PUSCH scheduled PRBs is 1, 3, 5, and so on, a method for transmitting a DMRS to the frequency region larger than that specified by the number of the corresponding PUSCH scheduled PRBs may be configured/operated by applying the DMRS length with respect to the case where the number of PRBs is 2, 4, 6, and so on, respectively (for example, the case where a DMRS sequence having the length-12/24/36 (for which RPF=2 is applied) is used).

In other words, as many PUSCH data as the number of the corresponding PUSCH scheduled PRBs are transmitted; however, since, in the case of DMRS transmission, a DMRS sequence having an RPF larger than 1, which is exactly the same as the PRB size (the number of PRBs is 1, 3, 5, . . . ) does not exist unless truncation is employed, the DMRS may be transmitted in a larger frequency region without truncation of the DMRS sequence.

To this purpose, if the number of PRBs of a DMRS is larger than the number of scheduled PRBs (for which an RPF larger than 1 is applied), it may be defined/configured so that a DMRS sequence may be transmitted by mapping the DMRS sequence starting from the lowest indexed PRB with respect to the scheduled PRB region and continuously beyond the highest indexed PRB of the scheduled PRB region.

Alternatively, mapping of a DMRS sequence may be aligned only up to the highest indexed PRB with respect to the scheduled PRB region. To this end, it may be defined/configured so that DMRS sequence mapping may be started from a PRB having an index lower than that of the lowest indexed PRB in the scheduled PRB region.

In this manner, whether a DMRS sequence mapped to a frequency region larger than the PUSCH data mapping region is mapped beyond the boundary of the lowest indexed PRB with respect to the PUSCH data mapping region and/or whether the DMRS sequence is mapped beyond the boundary of the highest indexed PRB may be predefined or configured/indicated for a UE. As one example, a UE may be configured/indicated in a semi-static manner through upper layer signaling (for example, RRC signaling) or switched/indicated to a first layer (L1: Layer1) level (for example, by DCI) and/or a second layer (L2: Layer2) level (for example, by MAC CE).

For example, the mapping direction of the DMRS sequence (namely the direction of a resource region along which the DMRS sequence is mapped beyond PUSCH data) may be switched/selected dynamically by implicit indication according to the form (or location) of the PRB region scheduled to the corresponding UE so that if the corresponding scheduled PRB region is a PRB region lower-indexed than the central region of the whole PRB region of the corresponding system, the DMRS sequence is mapped to a larger region than occupied by the PUSCH data toward the higher-indexed PRB of the latter; if the corresponding scheduled PRB region corresponds to a PRB region higher-indexed than the central region of the whole PRB region, the DMRS sequence is mapped to a larger region than occupied by the PUSCH data toward the lower-indexed PRB of the former. By doing so, scheduling flexibility of the eNB may be improved.

Alternatively, mapping direction (namely the direction in the resource region along which the DMRS is mapped beyond the region occupied by PUSCH data) of a DMRS sequence may be predetermined or configured for a UE so that the mapping direction is determined implicitly in conjunction with a specific comb type. For example, mapping direction may be predetermined or configured for the UE so that when the resource region is scheduled in the form of odd comb, the DMRS sequence is mapped beyond a PUSCH data mapping region toward a lower-indexed PRB region while, when the resource region is scheduled in the form of even comb, the DMRS sequence is mapped beyond the PUSCH data mapping region toward a higher-indexed PRB region.

ii) In another method, when the number of PUSCH scheduled PRBs is 1, a DMRS sequence having a specifically defined length or a preconfigured length-6 (for example, reuse of a sequence meant for a Narrow Band Internet of Things (NB-IoT)) may be used. And/or when the number of scheduled PRBs is larger than 1 (for example, when the number of PUSCH scheduled PRBs is 3, 5, . . . ), an operation applying a maximum possible DMRS length not longer than the number of PUSCH scheduled PRBs (for example, when the number of PUSCH scheduled PRBs is 3, 5, and so on, a DMRS sequence having a length of 12, 24, and so on, respectively with reference to the case where the number of PRBs is 2, 4, and so on is used) may be defined or configured for the UE.

This method may be characterized by the fact that differently from the method i) above where the length of a DMRS sequence is longer than the number of PUSCH PRBs, the length of the DMRS sequence is shorter than the number of PUSCH PRBs, and in this case, various methods described in the method i) above may be applied similarly as a disposition/allocation option for the corresponding DMRS sequence.

For example, a DMRS sequence may be mapped so that it is always aligned with a PUSCH-scheduled lowest-indexed PRB. On the contrary, the DMRS sequence may be mapped so that it is aligned with a PUSCH-scheduled highest-indexed PRB. Upper layer signaling (for example, RRC signaling) may be used to configure which method to apply for mapping of a DMRS sequence within a PUSCH data region including the aforementioned methods, or dynamic indication (for example, by DCI) may be switched dynamically. Similarly, a method based on an specific implicit indication associated with a PUSCH-scheduled PRB region (and/or associated with a parameter such as an indicated comb type) may also be applied.

iii) In a yet another method, when the number of PUSCH scheduled PRBs is 1, 3, 5, . . . , an operation which uses a plurality of DMRS sequences (RPF>1) in concatenation thereof may be configured/indicated for the UE.

For example, in the case of a DMRS sequence of length-18 (for example, a case where the number of PUSCH scheduled PRBs is 3 when the DMRS sequence is mapped in the form of even/odd comb), a DMRS sequence of length-12 and a DMRS sequence of length-6 may be concatenated into one sequence. And/or in the case of a DMRS sequence of length-30 (for example, a case where the number of PUSCH scheduled PRBs is 5 when the DMRS sequence is mapped in the form of even/odd comb), a DMRS sequence of length-24 and a DMRS sequence of length-6 may be concatenated.

At this time, a DMRS sequence of length-6 may be defined or configured for the UE. For example, a specific DMRS sequence of length-6 may be pre-defined or pre-configured for the UE to support an operation such as reuse of a specific sequence intended for NB-IoT applications or determination based on a computer search.

To perform the operation above, a specific rule which determines a mapping order among DMRS sequence to be concatenated may be defined or configured for the UE. For example, similar to the methods described in D. i) above, a sequence having a long length may be mapped first to a lower PRB region, or a sequence having a short length may be mapped first to a lower PRB region. The aforementioned priority may be configured beforehand in a semi-static manner through upper layer signaling (for example, RRC signaling) or switched/indicated at the L1-level (for example, by DCI) and/or L2-level (for example, by MAC CE).

Alternatively, for example, according to whether the corresponding scheduled PRB region is a PRB region lower-indexed or higher-indexed than the central region of the whole PRB region of the corresponding system, which sequence is to be concatenated first may be associated implicitly or which sequence is to be concatenated first may be determined by being implicitly associated with a comb type indicated for the UE.

E. As an additional method, suppose a DMRS is created due to the comb extension at the time of initial PUSCH transmission and the initial PUSCH is transmitted according to the DMRS. If PHICH NACK (Non-acknowledgement) is received from the eNB, one of the following options may be applied regarding in which way to transmit the next corresponding retransmission PUSCH:

i) PUSCH retransmission may be performed by applying a comb-related operation in the same way as in the corresponding initial PUSCH transmission.

For example, if a scheduled RB size is smaller than the T_RB at the time of initial PUSCH transmission and thereby transmission is performed without employing comb extension even for the initial PUSCH transmission, PUSCH retransmission may still be performed without applying the comb extension.

If the initial PUSCH is transmitted by applying specific comb (for example, even comb or odd comb) since the scheduled RB size is larger than the T_RB at the time of initial PUSCH transmission, PUSCH retransmission may be performed by applying the same comb-related configuration.

More specifically, if a NACK signal is transmitted from the PHICH, PUSCH retransmission may be performed. At this time, PUSCH retransmission may be non-adaptive or adaptive.

Non-adaptive retransmission is triggered by a NACK signal on the PHICH. Non-adaptive retransmission uses the same resource set as in the previous PUSCH transmission. For example, the modulation method and the set of allocated resource blocks are not changed during the PUSCH retransmission.

On the other hand, adaptive retransmission is triggered by PDCCH DCI (for example, DCI format 0 or 4). If a new data indicator (NDI) flag is not toggled with respect to previous PUSCH transmission, retransmission is triggered. In the case of adaptive retransmission, a set of allocated resource blocks may be changed.

As described above, if the UE transmits a DMRS by applying an indicator (for example, even comb or odd comb) for determining a mapping resource of a specific DMRS sequence at the time of initial PUSCH transmission, the UE may also perform DMRS transmission by applying the same indicator even for retransmission of the corresponding PUSCH.

To give an example based on non-adaptive retransmission, the UE may not receive DCI again from the eNB at the time of PUSCH retransmission. Therefore, the UE may transmit a DMRS by using an indicator for determining a mapping resource of a DMRS sequence indicated within the most recent uplink-related DCI (namely, DCI for PUSCH scheduling) at the time of PUSCH retransmission (namely a DMRS sequence may be mapped).

ii) If the corresponding initial PUSCH has been transmitted by applying specific comb (for example, even comb) (for example, when the scheduled RB size is larger than the T_RB), PUSCH retransmission may be performed by applying a comb-related configuration having a pattern different from the transmission of the corresponding initial PUSCH.

To describe the characteristics in more general terms, as a hopping pattern based on a kind of comb-related configuration is predefined or configured for the UE through upper layer signaling (for example, RRC signaling), the UE may be configured according to a specific comb (for example, even comb or odd comb) configuration indicated/applied at the time of initial PUSCH transmission, and then a changed pattern of the comb-related configuration for retransmission may be automatically defined/configured.

For example, if even comb is applied at the time of the first (initial) PUSCH transmission, odd comb may be applied for the second PUSCH transmission as a PHICH NACK signal is received. As the PHICH NACK signal is received, even comb may be applied again for the third PUSCH transmission.

In this way, a method which enables a comb-related configuration to be changed for each PUSCH retransmission according to a specific comb-related "hopping pattern" may be defined or configured for the UE.

iii) In other method, it may be defined or configured for the UE so that a default comb-related scheme is always applied irrespective of whether a specific comb (for example, even comb) has been applied for the corresponding initial PUSCH transmission (for example, the case where the scheduled RB size is larger than the T_RB) or whether the initial PUSCH transmission has been performed according to a legacy scheme without comb application (for example, the case where the scheduled RB size is smaller than the T_RB).

For example, the default pattern may be defined or configured for the UE so that the transmission is performed only in a legacy scheme without involving comb extension. This scheme brings such an effect that even though a comb extension operation is applied for initial PUSCH transmission, if retransmission is triggered due to the PHICH NACK signal (by performing transmission without employing comb but only in the same form in the legacy scheme), retransmission may be performed as reliably as possible.

Alternatively, the corresponding default form may be separately defined or configured for the UE so that the default pattern may employ the comb extension but is confined to a specific comb-related configuration. For example, a single, specific default comb type which always employs only the even comb may be defined or configured for the UE.

F. As an additional method, the DMRS generation method based on comb extension may be defined or configured for the UE in such a way as shown in a new table (for example, one of Tables 11 to 13 below) which also includes a comb configuration method in the CS($n_{DMRS,\lambda}^{(2)}$)+OCC([$w^{(\lambda)}(0)$ $w^{(\lambda)}(1)$]) table (namely a table which defines a mapping relationship between a cyclic shift field, a factor ($n_{DMRS,\lambda}^{(2)}$) for determining a cyclic shift value applied to a DMRS, and OCC ([$w^{(\lambda)}(0)$ $w^{(\lambda)}(1)$])) as in the Table 9 of the prior art. In other words, CS+OCC+comb (namely, $n_{DMRS,\lambda}^{(2)}$, [$w^{(\lambda)}(0)$ $w^{(\lambda)}(1)$], and comb configuration method) may be jointly encoded to the cyclic shift field and delivered to the UE within DCI.

And DCI may be used for dynamic indication. In other words, DCI may dynamically indicate whether to use the existing table such as Table 9 or whether to use a new table including a comb configuration method.

Table 11 illustrates one example of a joint encoding table between CS($n_{DMRS,\lambda}^{(2)}$)+OCC ([$w^{(\lambda)}(0)$ $w^{(\lambda)}(1)$])+comb (even/odd) according to one embodiment of the present invention.

In other words, Table 11 illustrates a mapping relationship between a cyclic shift field, a factor ($n_{DMRS,\lambda}^{(2)}$) for determining a cyclic shift value applied to a DMRS, OCC([$w^{(\lambda)}(0)$ $w^{(\lambda)}(1)$]), and an indicator (namely, comb type) for determining a mapping resource of the DMRS sequence.

TABLE 11

| Cyclic Shift Field in uplink-related DCI format | $n_{DMRS,\lambda}^{(2)}$ | | | | [$w^{(\lambda)}(0)$ $w^{(\lambda)}(1)$] | | | | comb type |
|---|---|---|---|---|---|---|---|---|---|
| | $\lambda=0$ | $\lambda=1$ | $\lambda=2$ | $\lambda=3$ | $\lambda=0$ | $\lambda=1$ | $\lambda=2$ | $\lambda=3$ | |
| 000 | 0 | 6 | 3 | 9 | [1 1] | [1 1] | [1 -1] | [1 -1] | even |
| 001 | 6 | 0 | 9 | 3 | [1 -1] | [1 -1] | [1 1] | [1 1] | even |
| 010 | 3 | 9 | 6 | 0 | [1 -1] | [1 -1] | [1 1] | [1 1] | even |
| 011 | 9 | 3 | 0 | 6 | [1 1] | [1 1] | [1 -1] | [1 -1] | odd |
| 100 | 0 | 6 | 3 | 9 | [1 1] | [1 1] | [1 -1] | [1 -1] | odd |
| 101 | 6 | 0 | 9 | 3 | [1 -1] | [1 -1] | [1 1] | [1 1] | odd |
| 110 | 3 | 9 | 6 | 0 | [1 -1] | [1 -1] | [1 1] | [1 1] | odd |
| 111 | 9 | 3 | 0 | 6 | [1 1] | [1 1] | [1 -1] | [1 -1] | even |

The underlined cells of Table 11 correspond to the fields updated from Table 9 above. In other words, the value (even/odd) of comb type; the factor ($n_{DMRS,\lambda}^{(2)}$) for determining a cyclic shift value applied to the DMRS with respect to the cyclic shift field 011, 100, 101, and 110; and codeword of OCC ($[w^{(\lambda)}(0)\ w^{(\lambda)}(1)]$) may be updated from the Table 9 above.

More specifically, the table may be updated in such a way that content including a cyclic shift (CS) distance of 2, which may be indicated by the existing cyclic shift fields 011, 100, 101, and 110 is all deleted, and the other existing states (and OCC configurations which are the same as the states) which apply only the CS distance of 3 are repeatedly applied, but whether a DMRS is even or odd comb is distinguished. In other words, groups (namely {'000', '001', '010', '111'} and {'011', '100', '101', '110'}) of states related to the CS distance of 3, which are applied repeatedly, may be indicated to reveal whether a DMRS is even or odd comb.

Here, the CS distance may mean a difference between the cyclic shift values (or $n_{DMRS,\lambda}^{(2)}$ values) with respect to different layers about the same UE (namely the same cyclic shift field value) or a difference between the cyclic shift values (or $n_{DMRS,\lambda}^{(2)}$ values) with respect to different UEs (namely different cyclic shift field values) about the same layer; for the convenience of descriptions, however, the CS distance indicates a difference of $n_{DMRS,\lambda}^{(2)}$ values with respect to the same layer 1 or 2 or less about different UEs. In other words, from Table 9, in the case of layer 1, since the $n_{DMRS,\lambda}^{(2)}$ value indicated by the cyclic shift field '011', '100', '101', and '110' are 2, 4, 8, and 10 respectively, the (minimum) cyclic shift distance (difference between $n_{DMRS,\lambda}^{(2)}$ values) corresponds to 2, while, since the $n_{DMRS,\lambda}^{(2)}$ values indicated by '000', '001', '010', and '111' are 0, 3, 6, and 9 respectively, the (minimum) cyclic shift distance (difference between $n_{DMRS,\lambda}^{(2)}$ values) corresponds to 3.

That is, in the present document, 011, 100, 101, and 110 among the states of the cyclic shift fields are called states with a cyclic shift (CS) distance of 2; and 000, 001, 010, and 111 are called states with a cyclic shift distance of 3.

As a result, Table 11 may be regarded as retaining only part of the configurations of Table 9 (for example, those states of Table 11, which are not underlined) and the retained states may be regarded as being allocated for comb type indicators (namely indicators for determining mapping resources of a DMRS sequence) that may be used to indicate even or odd comb.

Table 11 is only an example and may be defined/indicated in another way that at least one of other table modification elements is applied as follows, where a joint encoding table for the corresponding combination of CS, OCC, and comb is changed.

i) Instead of the current 3-bit table (namely a joint encoding table for a combination of CS and OCC which may be indicated by a cyclic shift field of 3 bits), the bit width of the cyclic shift field may be extended, for example, a 4-bit table, to allocate more state information.

For example, if Table 11 is extended to 4 bits (namely, the cyclic shift field is composed of four bits), Table 9 is used as it is but repeated twice to configure one by even comb while the other one may be configured by odd comb.

ii) The table may be composed within a total of 3 bits of the cyclic shift field in such a way that states reflecting CS distance of 3 ('000', '001', '010', and '111' state in Table 9) or CS distance of 2 ('011', '100', '101', and '110' state in Table 9) are mixed together.

For example, as shown in Table 11, the four repeating states are not extracted only as the states reflecting CS distance of 3. Together with the four repeating states, part of the states (namely the '011', '100', '101' and '110' states of Table 9) reflecting CS distance of 2 are mixed with a specific ratio. X states (for example, X=4) out of the mixed states are extracted to define a table, and specific comb type such as even or odd comb may be indicated by the corresponding table.

For example, when X=4, states reflecting CS distance of 3 ('000', '001', '010', and '111' state from Table 9) and states reflecting CS distance of 2 (namely '011', '100', '101', and '110' state from Table 9) may be defined as shown in Table 12 or 13 below.

Tables 12 and 13 illustrates examples of joint encoding tables between CS ($n_{DMRS,\lambda}^{(2)}$) OCC ($[w^{(\lambda)}(0)\ w^{(\lambda)}(1)]$), and comb (even/odd) according to one embodiment of the present invention.

That is, Tables 12 and 13 define a mapping relationship between the cyclic shift fields, factors ($n_{DMRS,\lambda}^{(2)}$) for determining cyclic shift values applied to a DMRS, OCC ($[w^{(\lambda)}(0)\ w^{(\lambda)}(1)]$), and indicators (namely, comb type) for determining mapping resources of the DMRS sequence.

TABLE 12

| Cyclic Shift Field in uplink-related DCI format | $n_{DMRS\lambda}^{(2)}$ | | | | $[w^{(\lambda)}(0)\ w^{(\lambda)}(1)]$ | | | | comb type |
|---|---|---|---|---|---|---|---|---|---|
| | $\lambda=0$ | $\lambda=1$ | $\lambda=2$ | $\lambda=3$ | $\lambda=0$ | $\lambda=1$ | $\lambda=2$ | $\lambda=3$ | |
| 000 | 0 | 6 | 3 | 9 | [1 1] | [1 1] | [1 −1] | [1 −1] | even |
| 001 | 6 | 0 | 9 | 3 | [1 −1] | [1 −1] | [1 1] | [1 1] | even |
| 010 | 3 | 9 | 6 | 0 | [1 −1] | [1 −1] | [1 1] | [1 1] | even |
| 011 | 4 | 10 | 7 | 1 | [1 1] | [1 1] | [1 1] | [1 1] | odd |
| 100 | 2 | 8 | 5 | 11 | [1 1] | [1 1] | [1 1] | [1 1] | odd |
| 101 | 8 | 2 | 11 | 5 | [1 −1] | [1 −1] | [1 −1] | [1 −1] | odd |
| 110 | 10 | 4 | 1 | 7 | [1 −1] | [1 −1] | [1 −1] | [1 −1] | odd |
| 111 | 9 | 3 | 0 | 6 | [1 1] | [1 1] | [1 −1] | [1 −1] | even |

TABLE 13

| Cyclic Shift Field in uplink-related DCI format | $n_{DMRS,\lambda}^{(2)}$ | | | | $[w^{(\lambda)}(0)\ w^{(\lambda)}(1)]$ | | | | comb type |
|---|---|---|---|---|---|---|---|---|---|
| | $\lambda = 0$ | $\lambda = 1$ | $\lambda = 2$ | $\lambda = 3$ | $\lambda = 0$ | $\lambda = 1$ | $\lambda = 2$ | $\lambda = 3$ | |
| 000 | 0 | 6 | 3 | 9 | [1 1] | [1 1] | [1 −1] | [1 −1] | odd |
| 001 | 6 | 0 | 9 | 3 | [1 −1] | [1 −1] | [1 1] | [1 1] | odd |
| 010 | 3 | 9 | 6 | 0 | [1 −1] | [1 −1] | [1 1] | [1 1] | odd |
| 011 | 4 | 10 | 7 | 1 | [1 1] | [1 1] | [1 1] | [1 1] | even |
| 100 | 2 | 8 | 5 | 11 | [1 1] | [1 1] | [1 1] | [1 1] | even |
| 101 | 8 | 2 | 11 | 5 | [1 −1] | [1 −1] | [1 −1] | [1 −1] | even |
| 110 | 10 | 4 | 1 | 7 | [1 −1] | [1 −1] | [1 −1] | [1 −1] | even |
| 111 | 9 | 3 | 0 | 6 | [1 1] | [1 1] | [1 −1] | [1 −1] | odd |

In Table 11, different comb types indicating even or odd comb have been configured for groups of states reflecting CS distance of 3, which are applied repeatedly; the same comb type has been configured for the states belonging to the same group. In Tables 12 and 13, since one of groups of repeated states reflecting CS distance of 3 (namely '011', '100', '101', and '110' states in Table 9) is replaced with states (namely '011', '110', '101', and '110' states) reflecting CS distance of 2, states reflecting CS distance of 3 are grouped together in the same manner as in Table 11, for which the same comb type is configured while states reflecting CS distance of 2 are also grouped together, for which the same comb type is configured.

In Table 12, states (namely '000', '001', '010', and '111' states in Table 9) reflecting CS distance of 3 and states (namely '011', '100', '101', and '110' states of Table 9) reflecting CS distance of 2 are extracted. States reflecting CS distance of 3 as in Table 11 indicate even comb while states reflecting CS distance of 2 indicate odd comb.

On the other hand, in Table 13, states (namely '000', '001', '010', and '111' states in Table 9) reflecting CS distance of 3 and states (namely '011', '100', '101', and '110' states of Table 9) reflecting CS distance of 2 are extracted. On the contrary to Table 11, states reflecting CS distance of 3 indicate odd comb while states reflecting CS distance of 2 indicate even comb.

Referring to Tables 12 and 13, $n_{DMRS,\lambda}^{(2)}$ value and codeword of OCC ($[w^{(\lambda)}(0)\ w^{(\lambda)}(1)]$) may be defined in the same way for Table 9 and the states of all the cyclic shift fields. However, part of the values (namely states) that may be indicated by the cyclic shift fields may indicate a first value (namely even or odd) of the indicator for determining mapping resources of the DMRS sequence, and the remaining values (namely states) may indicate a second value of the indicator for determining mapping resources of the DMRS sequence. At this time, the first and the second value are different from each other.

As one example, values (namely, '000', '001', '010', and '111' states) which guarantee the maximum cyclic shift distance among the values (namely states) that may be indicated by cyclic shift fields may indicate a first value (namely even (in the case of Table 12) or odd (in the case of Table 13)) of the indicator for determining mapping resources of the DMRS sequence, and the remaining values (namely '011', '100', '101', and '110' states) may indicate a second value (namely odd (in the case of Table 12) or even (in the case of Table 13)) of the indicator for determining mapping resources of the DMRS sequence. At this time, the first and the second value are different from each other.

To describe in more detail about the example, CS separation may be used as a main method for DMRS multiplexing. In Code Division Multiplexing (CDM) based channel estimation, if a large-spaced CS value is allocated to each layer or each antenna, better channel estimation performance may be achieved.

In the case of single user (SU)-MIMO, if one UE transmits rank 2 uplink transmission, channels for each layer may be distinguished from each other by using a DMRS sequence with respect to a first and a second layer. Therefore, it is preferable that CS values of each layer have the largest spacing among them. Also, in the case of MU-MIMO, since a different timing offset may exist for each UE, it is preferable that CS values having large spacing in the same layer of each UE are allocated.

Therefore, among the values (namely states) which may be indicated by the cyclic shift field, those values (namely '000', '001', '010', and '111' states) which guarantee the largest cyclic shift distance may indicate the same values (namely the values which may all be indicated as even or odd) of the indicator for determining mapping resources of the DMRS sequence.

As a result, if the value of the cyclic shift field is '000', '001', '010', or '111', a first value of the indicator for determining mapping resources of the DMRS sequence is indicated while, if the value of the cyclic shift field is '011', '100', '101', or '110', a second value of the indicator for determining mapping resources of the DMRS sequence may be indicated.

iii) As shown in Tables 11 to 13, the comb type (namely the indicator for determining mapping resources of the DMRS sequence, for example, even or odd) may be applied commonly to multi-layers (namely Lambda=0, 1, 2, or 3) used for PUSCH transmission.

Alternatively, a table may be defined so that different comb types (namely an indicator for determining mapping resources of the DMRS sequence) may be applied for each layer used for PUSCH transmission.

That is, when a cyclic shift field of '001', for example, is dynamically indicated for a specific UE, (and PUSCH transmission with respect to 3 layers of Lambda=1, 2, 3 is scheduled for the specific UE), a table may be defined to apply different comb types for each layer in such a way that even comb is applied for Lambda=1, odd comb for Lambda=2, and even comb for Lambda=3.

To this end, it is preferable that the total table bit width (namely bit length of the cyclic shift field) is extended to have more than 4 bits.

iv) Allocation of OCC for each layer may be reconfigured more effectively than existing methods when the allocation is configured together with comb type setting (namely an indicator for determining mapping resources of a DMRS sequence).

For example, an existing table element may be modified to apply an OCC [1 1] commonly between the '000' field (namely, state) and the '001' field (namely, state) where the DMRS, $n_{DMRS,\lambda}^{(2)}$ value forms a relationship as found between 0 and 6.

Since the CS distance is 6 between the '000' field (namely, state) and the '001' field (namely, state) where the $n_{DMRS,\lambda}^{(2)}$ values form a relationship as found between 0 and 6, which are already maximally separated from each other (when 1-layer scheduling is assumed), it is not necessary to apply different OCCs; rather, the same OCC is applied as above to allocate different OCC resources to different cases. Moreover, the present invention performs joint encoding even for the comb type configuration and thereby expands the region of orthogonal resources up to the case in which the comb type is allocated differently. Therefore, elements of a table may be modified so that the same OCC and/or comb type is allocated as much as possible for the states (and layers) the allowed CS distances of which do not exhibit a large difference from each other. Meanwhile, elements of the table may be modified so that different OCCs and/or different comb types are allocated as much as possible for the states (and layers) the allowed CS distances of which exhibit a large difference from each other. The aforementioned scheme is advantageous in terms of performance enhancement and configuration flexibility.

As described above, when a new table such as one of Tables 11 to 13 is introduced, whether to make a UE use the new PUSCH-DMRS table or a legacy table (refer to Table 9) may be switched/indicated by upper layer signaling (for example, RRC signaling).

Similarly, by using one of the G method described below or subsequent methods described in detail, whether to make a UE use a new PUSCH-DMRS related table such as one of Tables 11 to 13 or a legacy table (refer to Table 9) may be indicated explicitly or implicitly.

For example, by defining an additional bit field (for example, a mapping table indicator) in the DCI format, whether to make the UE use a new PUSCH-DMRS related table (the first mapping table) such as one of Tables 11 to 13 or a legacy table (refer to Table 9) (the second mapping table) may be indicated.

Alternatively, by reusing existing fields within the DCI format, whether to make the UE use a new PUSCH-DMRS related table such as one of Tables 11 to 13 or a legacy table (refer to Table 9) may be indicated.

As another example, it may be indicated implicitly to apply a new PUSCH-DMRS related table such as one of Tables 11 to 13 only for a specific subframe set, specific DCI format (for example, DCT format 0 or 4), specific control channel type (for example, a specific set (set 0 or set 1) of the EPDCCH or EPDCCH), DCI delivered to specific search space (for example, only to USS or CSS), and/or DCI masked by a specific RNTI whereas it may be indicated implicitly to apply a legacy table (refer to Table 9) for other cases.

G. The aforementioned method for configuring an operation applying a specific comb extension to a UE is made to operate as described above when at least one of the following conditions is satisfied (or part of the following conditions may be combined to be used as a new one)

i) Through specific upper layer signaling (for example, RRC signaling) (or in implicit conjunction with a feature configured by existing, specific RRC such as TM configuration), the comb extension operation may be configured in a semi-static manner to be activated (and/or deactivated).

ii) Indication by explicit DCI: by defining an additional bit field in a specific DCI format or by reusing an existing field, activation of the comb extension operation may be indicated explicitly.

And/or a separate RNTI for indicating different PUSCH scheduling as described above may be assigned, and when DCI scheduled according to the RNTI is detected, the UE may be made to perform the PUSCH transmission (namely comb extension operation).

iii) Implicit Indication:

The eNB may provide a subframe set-related configuration to the UE in advance, and when the corresponding UL-related DCI is received within a specific subframe(s), the comb extension operation may be performed.

Alternatively, if a specific condition is met, such as one in which a scheduling grant is delivered in a specific DCI format (for example, DCI format 0 or 4), one in which the scheduling grant is delivered to specific search space (for example, only to USS or CSS), or one in which the scheduling grant is delivered to a specific control channel type (for example, EPDCCH or a particular set (set 0 or set 1) of EDPCCH), the aforementioned comb extension operation may be performed. The specific condition may be predefined or configured through upper layer signaling (for example, RRC signaling).

3. Time/frequency domain extension (for example, an extended form combining comb and OCC)

A. Since the present embodiment combines the methods 1 and 2 described above, the whole or part of the operations described above may be applied together/simultaneously by default.

In this case, the amount of orthogonal PUSCH DMRS resources may be increased. For example, if time domain OCC length-4 is applied by the method 1 (which increases the amount of orthogonal resources twice as much as the original amount), and the frequency domain even/odd comb is applied together by the method 2 (which increases the amount of orthogonal resources twice as much as the original amount), the total amount of orthogonal resources is increased four times as much as the original amount.

In what follows, additional specific operations according to the present embodiment will be described.

B. Comb extension performed by the method 2 may be operated/configured in a modified form so that instead of allocating (namely, UE 1 uses even comb, and UE 2 uses odd comb) the comb extension among different, enhanced UEs, one UE uses all of the even and odd comb resources, but different OCCs are applied for each comb type.

That is, the aforementioned operation may be interpreted that OCC length-4 is applied, but rather than apply the OCC length-4 only to the time domain as done by the method 1, a kind of time/frequency OCC length-4 is used.

In this case, without involving multi-subframe scheduling such as subframe bundling as in the method 1, PUSCH scheduling may be performed in a single subframe as in the prior art.

At this time, while, according to the prior art, OCC length-2 is applied over 2 DMRS symbols belonging to the corresponding subframe, in the present embodiment, frequency resources within each DMRS symbol are divided additionally (in the form of comb), and other OCC resources are made to be applied for each comb type.

Figure 16:
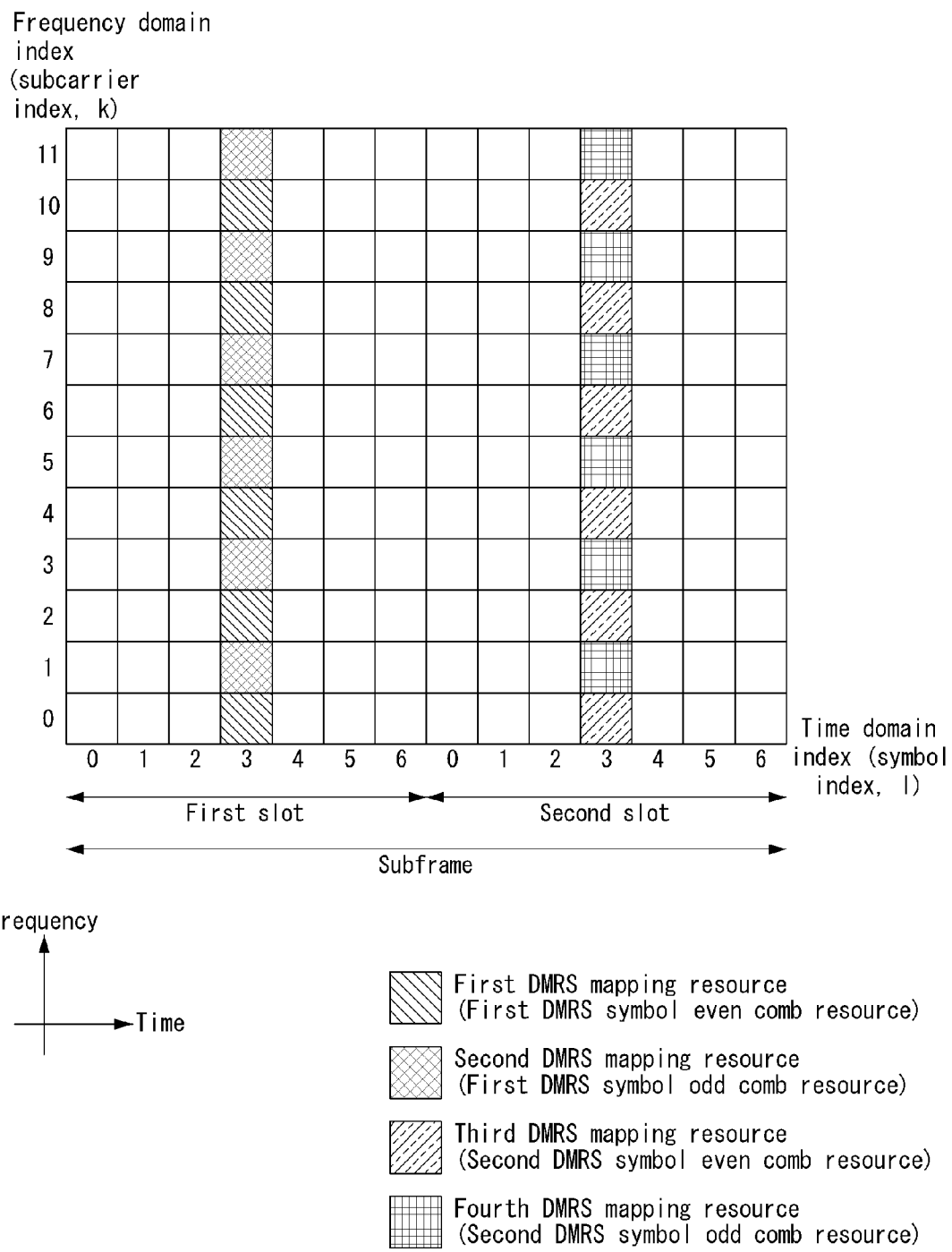
FIG. 16 illustrates an uplink PUSCH DMRS mapping method according to one embodiment of the present invention.

FIG. 16 illustrates an uplink PUSCH DMRS mapping method according to one embodiment of the present invention.

FIG. 16 illustrates a case in which normal cyclic prefix is applied.

For the convenience of descriptions, FIG. 16 illustrates a case in which one RB (namely 12 subcarriers) in the frequency domain and a PUSCH resource of one subframe in the time domain are allocated for a UE, but the present invention is not limited to the specific case.

For example, four resources having OCC length-4 are called as follows.

OCC1: [+1, +1, +1, +1],
OCC2: [+1, −1, +1, −1],
OCO3: [+1, +1, −1, −1],
OCO4: [+1, −1, −1, +1].

For example, suppose the corresponding UE is configured to have OCC4.

Referring to FIG. 16, PUSCH transmission may be performed by performing mapping of a DMRS sequence in such a way that +1 is applied (namely a DMRS sequence mapped to the corresponding symbol is multiplied by +1) to a first DMRS mapping resource (even comb resources of the first DMRS symbol (namely a DMRS symbol of the first slot)) within one scheduled subframe, −1 is applied to a second DMRS mapping resource (odd comb resources of the first DMRS symbol (namely a DMRS symbol of the first slot), −1 is applied to a third DMRS mapping resource (even comb resources of the second DMRS symbol (namely a DMRS symbol of the second slot), and +1 is applied to a fourth DMRS mapping resource (odd comb resources of the second DMRS symbol (namely a DMRS symbol of the second slot).

In which order the OCCx is applied to the DMRS mapping resources may be defined or configured in an order different from that shown above.

For example, when the OCC4 is configured, differently from the aforementioned example showing the order of applying +1, −1, −1, and +1, mapping may be performed first on the second DMRS symbol, or odd comb resource positions may be mapped first.

At this time, the UE may map the same sequence element for the four RE position groups to which the OCCx (for example, OCC4) is applied. In other words, similarly to the case in which, when the existing OCC length-2 is applied to 2 symbols in the time domain, slop hopping is disabled, and the same sequence elements are applied, among 4 RE groups based on the OCC length-4, not only slot hopping may be disabled but also the same sequence element may be mapped and transmitted to the DMRS resource pair to which OCC is to be applied within the same DMRS symbol.

In other words, when one RB is divided in units of 6 REs to the even/odd comb, the DMRS sequence generated by the corresponding UE is repeated in such a way that 6 sequence elements distributed over 6 REs are repeated at even and odd positions, and the OCC has to be applied to the repeated positions.

The method described above is only an example, and a specific OCC length-T (for example, T=4) of method 3 according to the present embodiment is applied to each of the frequency resource division methods described with reference to the method 2, the same DMRS sequence elements may be applied to two or more RE positions belonging to an OCC pair within the same DMRS symbol.

At this time, in the case of a first or a second DMRS symbol, although spacing between symbols may be the same as shown in the current figure (namely in the case of normal cyclic prefix, the third symbol of the first slot and the third symbol of the second slot), the DMRS symbols may be newly designed to have different spacing, which may be generalized to have the first or the second DMRS symbol positioned at different subframes.

Also, dividing an RB into the even or odd comb resources is also only an example. Resource allocation for DMRS mapping may be applied for each of various forms of frequency-domain extension methods described in the method 2, which may be generalized to apply different OCCs for each method. For example, it may be defined/configured so that the condition D_k>2 is applied, and different OCCs may be applied for the respective DMRS resource regions distinguished according to which of the D_k=1, 2, or, D_k−1 indicated/configured to be applied by the corresponding UE is used. Also, as described in the method 2, the frequency resource division for DMRS mapping may also be applied in various forms such as RE-level or RB (group)-level.

C. In a method for configuring a UE to perform the aforementioned operation, if at least one condition is satisfied among the following methods, the UE may recognize that time/frequency domain extension (for example, comb+OCC extension) is applied (or part of the following conditions may be combined).

i) Indication Method Using Upper Layer Signaling

Through specific upper layer signaling (for example, RRC signaling or MAC control element (CE)), activation (and/or deactivation) of the aforementioned operation (namely DMRS sequence mapping and transmission operation applying time/frequency domain extension) may be configured in a semi-static manner.

Alternatively, by being implicitly linked to an existing RRC configuration characteristic(s) such as transmission mode configuration, activation (and/or deactivation) of the aforementioned operation may be configured.

ii) Method Using Implicit Indication

When the eNB provides a subframe set-related configuration to the UE in advance, and the corresponding UL-related DCI is received within a specific subframe(s), the aforementioned operation (namely DMRS sequence mapping and transmission operation applying time/frequency domain extension) may be performed.

And/or separate RNTI may be defined for indicating the aforementioned other PUSCH scheduling (namely PUSCH scheduling mapped to a DMRS sequence by applying time/frequency domain extension). When DCI scheduled according to the RNTI (DCI masked by the corresponding RNTI), the UE may be made to perform the PUSCH transmission described above.

iii) Method Using Implicit Indication iii-1) When a subframe set-related configuration is provided to the UE in advance, and the corresponding UL-related DCI is received within a specific subframe(s), the aforementioned operation (namely DMRS sequence mapping and transmission operation applying time/frequency domain extension) may be performed.

iii-2) if a specific condition is satisfied such that a scheduling grant is delivered in the DCI format (for example, DCI format 0 or 4), a scheduling grant is delivered to specific search space (for example, USS only or CSS only), or a scheduling grant is delivered to a specific control channel type (for example, EPDCCH or to a specific set (set 0 or set 1) of the EPDCCH), the aforementioned operation may be performed. The specific conditions above may be predefined or configured through upper layer signaling (for example, RRC signaling).

Meanwhile, at least one of the specific methods proposed by the present invention may inform the eNB in advance about whether the UE supports the corresponding method by using specific UE capability signaling.

Accordingly, on the basis of the UE capability signaling, the eNB may transmit configuration/indication about a specific operation to the UE within the technology that the corresponding UE supports.

For example, if a wireless communication system supports a PUSCH DMRS generation (and mapping) method based on the aforementioned method 1, method 2 and/or method 3, the UE may inform the eNB, through more precise UE capability signaling, that only a specific method is supported. For example, the UE may inform the eNB that the UE supports only the comb extension method of the method 2.

More specifically, the UE may also inform the eNB that the UE supports specific technical details with respect to the corresponding method. For example, the UE may inform the eNB that the UE supports only A method among comb extension methods of the method 2 or the UE supports A method and E method.

Figure 17:
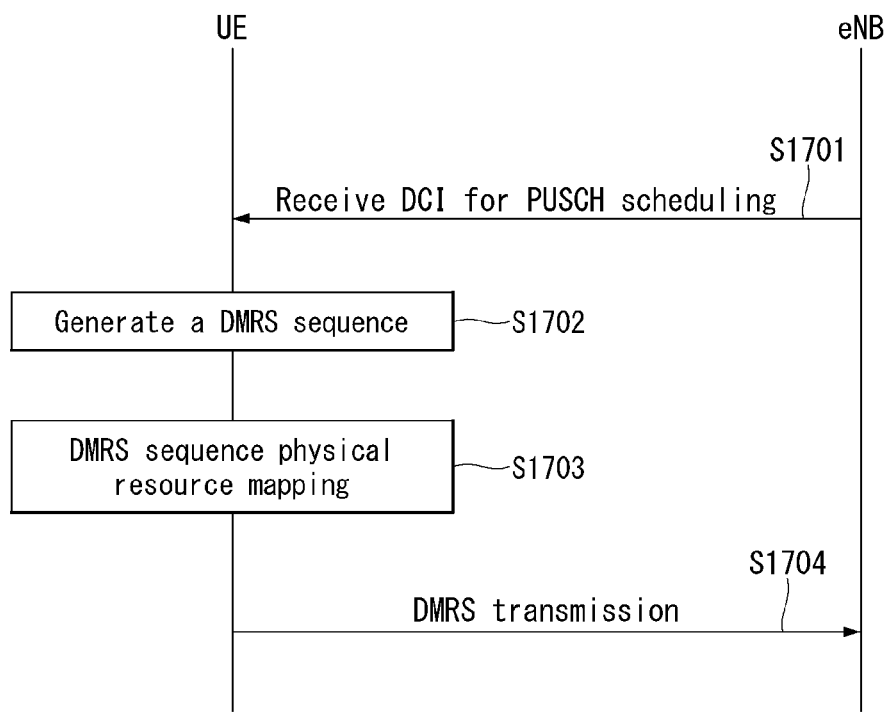
FIG. 17 illustrates a method for transmitting and receiving a DMRS according to one embodiment of the present invention.

FIG. 17 illustrates a method for transmitting and receiving a DMRS according to one embodiment of the present invention.

Referring to FIG. 17, a UE receives DCI (for example, DCI format 4) for PUSCH scheduling from an eNB S1701.

DCI may include information about a set of resource blocks allocated to the UE.

In particular, DCI may include a cyclic shift field (for example, 3 bits), and according to the value (or state) of the cyclic shift field (for example, 3 bits), a factor (namely $n_{DMRS,\lambda}^{(2)}$) for determining a cyclic shift value applied to a DMRS sequence, a codeword of the OCC (namely, $[w^{(\lambda)}(0)\ w^{(\lambda)}(1)]$) applied to the DMRS sequence and/or an indicator (comb configuration) for determining a mapping resource of the DMRS sequence may be determined.

As described above, if a new PUSCH-DMRS related table (a first mapping table), such as one of Tables 11 to 13, is defined, whether the new PUSCH-DMRS related table (the first mapping table), such as one of Tables 11 to 13, is used or whether an existing PUSCH-DMRS related table (a second mapping table) such as Table 9 is used may be indicated by the field (for example, a mapping table indicator) (for example, 1 bit) additionally defined within the DCI or by a previously defined field.

The UE generates a DMRS sequence for PUSCH S1702.

At this time, before the UE generates a DMRS sequence for PUSCH, the method 1, 2, or 3 described above may be used.

In other words, as described above, the UE may generates a base sequence and applies a cyclic shift to the base sequence, thereby generating a reference signal sequence to which a cyclic shift has been applied. And a PUSCH DMRS sequence may be generated by applying an OCC to the reference signal sequence to which a cyclic shift has been applied.

For example, if the method 2 above is used, a factor ($n_{DMRS,\lambda}^{(2)}$) for determining a cyclic shift value applied to a DMRS, OCC ($[w^{(\lambda)}(0)\ w^{(\lambda)}(1)]$) applied to the DMRS sequence, and indicator for determining a mapping resource of the DMRS sequence may be jointly encoded to be transmitted. As one example, the factor, OCC, and indicator may be jointly encoded to the cyclic shift field within the DCI and transmitted.

In other words, a first mapping table may be predefined in advance between the factor ($n_{DMRS,\lambda}^{(2)}$) for determining a cyclic shift value applied to a DMRS sequence, OCC ($[w(\lambda)(0)\ w^{(\lambda)}(1)]$) applied to the DMRS sequence, indicator for determining a mapping resource of the DMRS sequence, and the cyclic shift field; and by using the value of the cyclic shift field, the factor, codeword of the OCC, and indicator may be determined by the first mapping table.

At this time, if a field (for example, a mapping table indicator) defined additionally within the DCI or a predefined field indicates to use a new PUSCH-DMRS related table (a first mapping table) such as one of Tables 11 to 13, a factor (namely $n_{DMRS,\lambda}^{(2)}$) for determining a cyclic shift value applied to a DMRS may be determined, according to (or by) one of Tables 11 to 13, using the cyclic shift field within the DCI.

Meanwhile, as described above, if a field (for example, a mapping table indicator) defined additionally within the DCI or a predefined field indicates to use an existing PUSCH-DMRS related table (a second mapping table) such as Table 9, a factor (namely $n_{DMRS,\lambda}^{(2)}$) for determining a cyclic shift value applied to a DMRS may be determined, according to (or by) Table 9, using the cyclic shift field within the DCI.

Also, if a field (for example, a mapping table indicator) defined additionally within the DCI or a predefined field indicates to use a new PUSCH-DMRS related table (a first mapping table) such as one of Tables 11 to 13, an OCC (namely $[w^{(\lambda)}(0)\ w^{(\lambda)}(1)]$) may be determined, according to (or by) one of Tables 11 to 13, using the cyclic shift field within the DCI.

Meanwhile, as described above, if a field (for example, a mapping table indicator) defined additionally within the DCI or a predefined field indicates to use an existing PUSCH-DMRS related table (a second mapping table) such as Table 9, an OCC (namely $[w^{(\lambda)}(0)\ w^{(\lambda)}(1)]$) may be determined, according to (by) Table 9, using the cyclic shift field within the DCI.

Here, when upper layer (for example, RRC layer) parameters related to the DMRS mapping operation described in the method 1, 2, and 3 above are applied, if a new PUSCH-DMRS related table (a first mapping table) such as one of Tables 11 to 13 is indicated to be used, an OCC (namely $[w^{(\lambda)}(0)\ w^{(\lambda)}(1)]$), and a factor (namely $n_{DMRS,\lambda}^{(2)}$) for determining a cyclic shift value applied to a DMRS may be determined, according to (or by) one of Tables 11 to 13, using the cyclic shift field within the DCI.

In other words, if the upper layer (for example, RRC layer) parameters related to the DMRS mapping operation described in the method 1, 2, and 3 above are not applied, the OCC (namely $[w^{(\lambda)}(0)\ w^{(\lambda)}(1)]$) may be determined, according to (or by) Table 9, using the cyclic shift field within the DCI.

The UE maps a DMRS sequence to a physical resource S1703.

At this time, before generating a DMRS sequence for PUSCH, the UE may use the method 1, 2, or 3 described above.

For example, if the method 2 above is used, the DMRS sequence may be mapped with spacing of a predetermined resource element (RE) (or subcarrier) within the symbol (in other words, in the case of normal cyclic prefix, symbol index/time domain index I=3 and in the case of extended cyclic prefix, symbol index/time domain index I=2) to which the DMRS sequence is mapped.

At this time, the spacing of a predetermined resource element may be 1, 2, 3, and so on.

If the spacing of a predetermined resource element is 1, the DMRS sequence may be mapped only to an RE (or subcarrier) having an even-numbered frequency domain index or only to an RE (or subcarrier) having an odd-numbered frequency domain index.

At this time, an RE to which a DMRS sequence is mapped may be determined according to the value of an indicator for determining a mapping resource of the DMRS sequence. In other words, according to the value of an indicator for determining a mapping resource for a DMRS sequence, whether the DMRS sequence is mapped only to an RE (or subcarrier) having an even-numbered frequency domain index or only to an RE (or subcarrier) having an odd-numbered frequency domain index.

The UE transmits a DMRS to the eNB S1704.

At this time, the UE may transmit the PUSCH and the DMRS by multiplexing thereof. The UE may transmit the DMRS by mapping the DMRS within a set of resource blocks allocated for the PUSCH or transmit the DMRS by mapping the DMRS out of the set of resource blocks allocated for the PUSCH.

If the UE receives a NACK signal with respect to the PUSCH on the PHICH, the UE may retransmit the PUSCH; at this time, the UE may transmit the PUSCH and the DMRS by applying multiplexing the retransmitted PUSCH and the DMRS while performing the S1702 and S1703 steps again to retransmit the PUSCH.

At this time, if the UE transmits the DMRS by applying the value (for example, even comb or odd comb) of an indicator for determining a mapping resource of a specific DMRS sequence at the time of initial PUSCH transmission, the UE may also perform DMRS transmission by applying the same indicator value at the time of retransmission of the corresponding PUSCH. In other words, the UE may transmit the DMRS (namely the UE may map the DMRS sequence) by using the value of an indicator for determining a mapping resource of the DMRS sequence indicated within the most recent uplink-related DCI (namely DCI for PUSCH scheduling).

General Apparatus to which the Present Invention May be Applied

Figure 18:
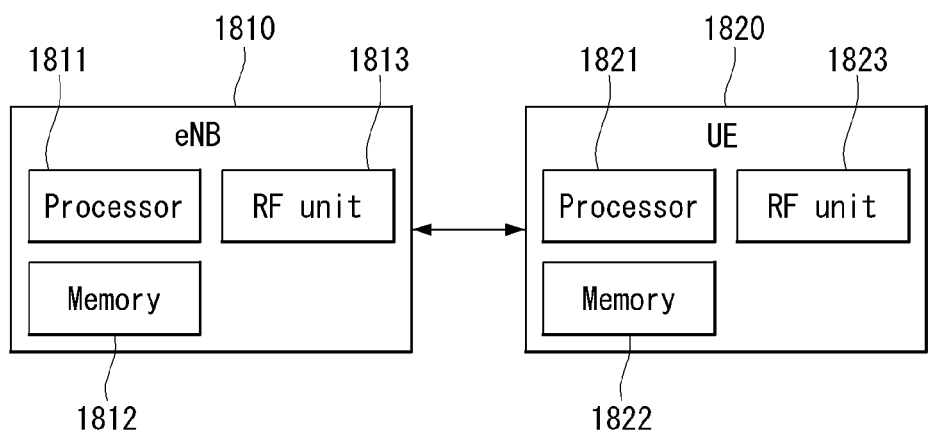
FIG. 18 illustrates a block diagram of a wireless communication apparatus according to one embodiment of the present invention.

FIG. 18 illustrates a block diagram of a wireless communication apparatus according to an embodiment of the present invention.

Referring to FIG. 18, the wireless communication system includes a base station (eNB) 1810 and a plurality of user equipments (UEs) 1820 located within the region of the eNB 1810.

The eNB 1810 includes a processor 1811, a memory 1812 and a radio frequency unit 1813. The processor 1811 implements the functions, processes and/or methods proposed in FIGS. 1 to 17 above. The layers of wireless interface protocol may be implemented by the processor 1811. The memory 1812 is connected to the processor 1811, and stores various types of information for driving the processor 1811. The RF unit 1813 is connected to the processor 1811, and transmits and/or receives radio signals.

The UE 1820 includes a processor 1821, a memory 1822 and a radio frequency unit 1823. The processor 1821 implements the functions, processes and/or methods proposed in FIGS. 1 to 17 above. The layers of wireless interface protocol may be implemented by the processor 1821. The memory 1822 is connected to the processor 1821, and stores various types of information for driving the processor 1821. The RF unit 1823 is connected to the processor 1821, and transmits and/or receives radio signals.

The memories 1812 and 1822 may be located interior or exterior of the processors 1811 and 1821, and may be connected to the processors 1811 and 1821 with well known means. In addition, the eNB 1810 and/or the UE 1820 may have a single antenna or multiple antennas.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

INDUSTRIAL APPLICABILITY

The present invention has been described based on an example in which it is applied to the 3GPP LTE/LTE-A systems, but may be applied to various wireless communication systems in addition to the 3GPP LTE/LTE-A systems.

The invention claimed is:
1. A method for transmitting an uplink Demodulation Reference Signal (DMRS) by a User Equipment (UE) in a wireless communication system, comprising:
 receiving, from a base station, Downlink Control Information (DCI) for Physical Uplink Shared Channel (PUSCH);
 generating a DMRS sequence for the PUSCH; and
 mapping the DMRS sequence to a physical resource,
 wherein the DCI includes information for a pre-configured value related to the mapping of the DMRS sequence,
 wherein the DMRS sequence is mapped to a Resource Element (RE) having a frequency domain index based on the pre-configured value within a symbol for which a DMRS for the PUSCH is configured, and wherein the pre-configured value is based on a remainder obtained by dividing the frequency domain index by a specific value.

2. The method of claim 1, wherein the specific value is 2.

3. The method of claim 2, wherein the DMRS sequence is mapped only to an RE having an even-numbered frequency domain index, or only to an RE having an odd-numbered frequency domain index.

4. The method of claim 1, wherein the DCI comprises a cyclic shift field,
wherein the cyclic shift field represents a value based on joint encoding of i) a factor for determining a cyclic shift value applied to the DMRS sequence, an Orthogonal Cover Code (OCC) applied to the DMRS sequence, and an indicator for determining a mapping resource of the DMRS sequence.

5. The method of claim 1, wherein the pre-configured value is based on a value of the indicator for determining a mapping resource of the DMRS sequence.

6. The method of claim 4,
wherein a first mapping table, representing i) the factor for determining a cyclic shift value applied to the DMRS sequence, ii) the OCC applied to the DMRS sequence, iii) the indicator for determining a mapping resource of the DMRS sequence, and iv) the cyclic shift field, is predefined and
wherein a value of the factor, a codeword of the OCC, and a value of the indicator the pre-configured value is based on are determined based on the value of the cyclic shift field.

7. The method of claim 6, wherein values which are able to ensure a maximum cyclic shift distance among values based on the cyclic shift field represent a first value of the indicator for determining a mapping resource of the DMRS sequence, and the remaining values represent a second value of the indicator for determining a mapping resource of the DMRS sequence.

8. The method of claim 6, wherein the cyclic shift field is configured with 3 bits,
wherein, based on the value of the cyclic shift field being '000', '001', '010', or '111', a first value of the indicator for determining a mapping resource of the DMRS sequence is indicated, and
wherein, based on the value of the cyclic shift field i-s-being '011', '100', '101', or '110', a second value of the indicator for determining a mapping resource of the DMRS sequence is indicated.

9. The method of claim 6, wherein the value of the indicator for determining a mapping resource of the DMRS sequence is applied commonly to all of the layers used for transmission of the PUSCH.

10. The method of claim 6, wherein a second mapping table representing the factor for determining a cyclic shift value applied to the DMRS sequence, the OCC applied to the DMRS sequence, and the cyclic shift field is predefined, and
wherein whether to use the first mapping table or the second mapping table is determined based on an indicator representing a mapping table within included in the DCI.

11. The method of claim 6, wherein the same value as that of the indicator for determining a mapping resource of the DMRS sequence used for transmission of the PUSCH is used for retransmission of the PUSCH.

12. The method of claim 6, wherein, based on that a Radio Resource Control (RRC) layer parameter related to whether to use the first mapping table is configured for the UE, the value of the factor, codeword of the OCC, and value of the indicator which are based on the first mapping table, are determined based on the value of the cyclic shift field.

13. The method of claim 3, wherein the DMRS sequence is frequency-multiplexed by being interlaced-mapped with a DMRS sequence of another UE in units of resource elements within a predetermined symbol.

14. The method of claim 3, wherein the time domain index of the symbol to which the DMRS sequence is mapped is 3 in the case of normal Cyclic Prefix (CP) and 2 in the case of extended CP.

15. A User Equipment (UE) transmitting an uplink DMRS in a wireless communication system, comprising:
a Radio Frequency (RF) unit for transmitting and receiving a radio signal; and
a processor for controlling the RF unit, wherein the processor is configured to:
receive, from a base station, Downlink Control Information (DCI) for Physical Uplink Shared Chanel (PUSCH),
generate a DMRS sequence for the PUSCH; and
map the DMRS sequence to a physical resource,
wherein the DCI includes information for a pre-configured value related to the mapping of the DMRS sequence,
wherein the DMRS sequence is mapped to a Resource Element (RE) having a frequency domain index based on the pre-configured value within a symbol for which a DMRS for the PUSCH is configured, and
wherein the pre-configured value is based on a remainder obtained by dividing the frequency domain index by a specific value.

16. The UE of claim 15, wherein the specific value is 2.

17. The UE of claim 16, wherein the DMRS sequence is mapped only to an RE having an even-numbered frequency domain index, or only to an RE having an odd-numbered frequency domain index.

18. The UE of claim 15, wherein the DCI comprises a cyclic shift field,
wherein the cyclic shift field represents a value based on joint encoding of i) a factor for determining a cyclic shift value applied to the DMRS sequence, ii) an Orthogonal Cover Code (OCC) applied to the DMRS sequence, and iii) an indicator for determining a mapping resource of the DMRS sequence.

19. The UE of claim 18, wherein an the pre-configured value is based on value of the indicator for determining a mapping resource of the DMRS sequence.

20. A Base station receiving an uplink DMRS in a wireless communication system, comprising:
a Radio Frequency (RF) unit for transmitting and receiving a radio signal; and
a processor for controlling the RF unit, wherein the processor is configured to transmit, to a user equipment (UE), Downlink Control Information (DCI) for Physical Uplink Shared Chanel (PUSCH),
wherein a DMRS sequence for the PUSCH is generated by the UE;
wherein the DMRS sequence is mapped, by the UE, to a physical resource,
wherein the DCI includes information for a pre-configured value related to the mapping of the DMRS sequence,
wherein the DMRS sequence is mapped to a Resource Element (RE) having a frequency domain index based on the pre-configured value within a symbol for which a DMRS for the PUSCH is configured, and wherein the pre-configured value is based on a remainder obtained by dividing the frequency domain index by a specific value.

* * * * *